(12) United States Patent
Na et al.

(10) Patent No.: US 11,863,260 B2
(45) Date of Patent: Jan. 2, 2024

(54) 5G COMMUNICATION METHOD BASED ON CHANGE IN SHAPE OF ELECTRONIC DEVICE AND ELECTRONIC DEVICE THEREFOR

(71) Applicant: SAMSUNG ELECTRONICS CO., LTD., Suwon-si (KR)

(72) Inventors: Hyoseok Na, Suwon-si (KR); Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 17/551,786

(22) Filed: Dec. 15, 2021

(65) Prior Publication Data

US 2022/0109472 A1 Apr. 7, 2022

Related U.S. Application Data

(63) Continuation of application No. PCT/KR2020/007983, filed on Jun. 19, 2020.

(30) Foreign Application Priority Data

Jun. 19, 2019 (KR) .......................... 10-2019-0072838

(51) Int. Cl.
*H04B 7/0456* (2017.01)
*H01Q 1/24* (2006.01)
(Continued)

(52) U.S. Cl.
CPC ........... *H04B 7/0456* (2013.01); *H01Q 1/243* (2013.01); *H01Q 3/02* (2013.01); *H04B 7/0617* (2013.01); *H04M 1/0214* (2013.01)

(58) Field of Classification Search
CPC .... H04B 7/0456; H04B 7/0617; H01Q 1/243; H01Q 3/02
(Continued)

(56) References Cited

U.S. PATENT DOCUMENTS 8,787,016 B2 7/2014 Rothkopf et al.
9,129,929 B2 9/2015 Lundberg
(Continued)

FOREIGN PATENT DOCUMENTS

CN 109193117 1/2019
EP 3 931 979 1/2022
(Continued)

OTHER PUBLICATIONS

Extended European Search Report dated Jun. 24, 2022 for EP Application No. 20827440.7.
(Continued)

*Primary Examiner* — Leila Malek
(74) *Attorney, Agent, or Firm* — Nixon & Vanderhye P.C.

(57) ABSTRACT

An electronic device may include a housing of which a shape is changeable, a plurality of antenna modules positioned inside the housing and including at least one antenna array, and at least one processor operatively connected to the plurality of antenna modules. The electronic device may detect a change in the shape of the housing and perform communication using a first beam book and/or a second beam book based at least on the change in the shape of the housing. In addition to the above, various embodiments identified through the specification are possible.

14 Claims, 15 Drawing Sheets

(51) Int. Cl.
*H01Q 3/02* (2006.01)
*H04B 7/06* (2006.01)
*H04M 1/02* (2006.01)

(58) Field of Classification Search
USPC .......................................................... 375/267
See application file for complete search history.

(56) References Cited

U.S. PATENT DOCUMENTS

| | | | |
|---|---|---|---|
| 9,504,170 | B2 | 11/2016 | Rothkopf et al. |
| 9,863,915 | B2 | 1/2018 | Hwang et al. |
| 10,052,859 | B2 | 8/2018 | Park |
| 10,079,425 | B2 | 9/2018 | Chun et al. |
| 10,104,787 | B2 | 10/2018 | Rothkopf et al. |
| 10,440,727 | B2 | 10/2019 | Nilsson |
| 10,442,173 | B2 | 10/2019 | Park |
| 10,615,485 | B2 | 4/2020 | Chun et al. |
| 10,694,624 | B2 | 6/2020 | Rothkopf et al. |
| 11,075,469 | B2 | 7/2021 | Huh et al. |
| 2003/0181211 | A1* | 9/2003 | Razavilar ............. H04W 36/06 455/450 |
| 2013/0010405 | A1 | 1/2013 | Rothkopf et al. |
| 2013/0277821 | A1 | 10/2013 | Lundberg |
| 2014/0159231 | A1 | 6/2014 | Lundberg |
| 2014/0203966 | A1 | 7/2014 | Sultenfuss et al. |
| 2014/0240178 | A1 | 8/2014 | Chun et al. |
| 2014/0328041 | A1 | 11/2014 | Rothkopf et al. |
| 2015/0090044 | A1 | 4/2015 | Hwang et al. |
| 2016/0318296 | A1 | 11/2016 | Park |
| 2017/0013729 | A1 | 1/2017 | Rothkopf et al. |
| 2018/0062717 | A1 | 3/2018 | Mok et al. |
| 2018/0319149 | A1 | 11/2018 | Park |
| 2018/0358684 | A1 | 12/2018 | Chun et al. |
| 2019/0053388 | A1 | 2/2019 | Rothkopf et al. |
| 2019/0069309 | A1 | 2/2019 | Nilsson |
| 2020/0008211 | A1 | 1/2020 | Nilsson |
| 2020/0235459 | A1 | 7/2020 | Chun et al. |
| 2020/0280360 | A1* | 9/2020 | Bai ...................... H04B 7/088 |

FOREIGN PATENT DOCUMENTS

| | | |
|---|---|---|
| KR | 10-2014-0105886 | 9/2014 |
| KR | 10-2015-0038873 | 4/2015 |
| KR | 10-2020-0074411 | 6/2020 |

OTHER PUBLICATIONS

International Search Report dated Oct. 7, 2020 in corresponding International Application No. PCT/KR2020/007983.

* cited by examiner

5G COMMUNICATION METHOD BASED ON CHANGE IN SHAPE OF ELECTRONIC DEVICE AND ELECTRONIC DEVICE THEREFOR

CROSS-REFERENCE TO RELATED APPLICATIONS

This application is a continuation of International Application No. PCT/KR2020/007983 designating the United States, filed Jun. 19, 2020, in the Korean Intellectual Property Receiving Office and claiming priority to Korean Patent Application No. 10-2019-0072838 filed Jun. 19, 2019, the disclosures of which are incorporated by reference herein in their entireties.

BACKGROUND

Field

Various embodiments of the present disclosure relate to a $5^{TH}$ generation (5G) communication method based on at least a change in a form of an electronic device and/or an electronic device therefor.

Description of Related Art

With the recent rapid increase in network traffic by mobile devices, 5-th mobile communication (5G) technology using signals in an ultra-high frequency band has been developed. For example, mmWave, where the wavelength length of signals in millimeters, may be used in 5G mobile communication. Since the above-mentioned signals in the ultra-high frequency band have strong linearity, an electronic device may have to be positioned at a line of sight (LoS) with a base station in order to perform communication with an electronic device or the base station using the signals in the ultra-high frequency band. For example, the electronic device and the base station may transmit and receive signals using beamforming. Unlike an omni-directional beam pattern in the conventional art, a beam-formed beam pattern of the electronic device may have relatively high directivity.

In addition, technologies for increasing a display surface of mobile devices are being developed. In order to improve the portability and display size of the mobile device, the form of mobile device may be changed. For example, a portion of the mobile device may be folded. For another example, a portion of the mobile device may be extended.

SUMMARY

When the electronic device performs communication using beamforming, the electronic device may perform communication using a beam (at least one beam) having a relatively sharp beam pattern. The electronic device may use a plurality of antenna arrays in order to generate beam coverage in various directions of the electronic device. Each of the plurality of antenna arrays may be positioned inside a housing of the electronic device to form beams in different directions.

If the physical form of the electronic device is changed, positions of antenna arrays of the electronic device may also be changed with the change in the form. In this example case, with the change in the positions of the antenna arrays, the beam coverage of the antenna arrays may also be changed.

Various example embodiments may provide a method and an electronic device for operating beam books with a change in the physical form of the electronic device.

According to an example aspect, there is provided an electronic device including a housing of which a form is changeable, a plurality of antenna modules positioned inside the housing, each of the plurality of antenna modules including at least one antenna array, at least one processor operatively connected to the plurality of antenna modules and configured to perform beamforming using the at least one antenna array, and a memory connected to the at least one processor, in which the memory stores one or more instructions configured to cause, when executed, the at least one processor to perform communication based at least on a first beam book including information on beams associated with at least some of the plurality of antenna modules, using the plurality of antenna modules, detect a change in the form of the housing during communication based at least on the first beam book, and perform communication based at least on a second beam book including information on beams associated with at least some of the plurality of antenna modules and including information on beams different from the at least a portion of the first beam book, in response to at least the change in the form.

According to an example aspect, there is provided a communication method of an electronic device including a housing of which a form is changeable, the communication method including performing communication based on a first beam book including information on beams associated with at least some of the plurality of antenna modules, using a plurality of antenna modules positioned in the housing, detecting a change in the form of the housing during communication based on the first beam book, and performing communication based on a second beam book including information on beams associated with at least some of the plurality of antenna modules and including information on beams different from the at least a portion of the first beam book, in response to the change in the form.

According to various example embodiments, an electronic device may perform communication using beam books corresponding to at least a change in the form of the electronic device.

According to various example embodiments, the electronic device may reduce or minimize the beam search time using a beam mapped between beam books different from each other.

Besides, various effects may be provided that are directly or indirectly understood through the disclosure.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements. Any of the embodiment(s) described herein may be used in conjunction with any other embodiment(s) described herein.

DETAILED DESCRIPTION

Hereinafter, various example embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
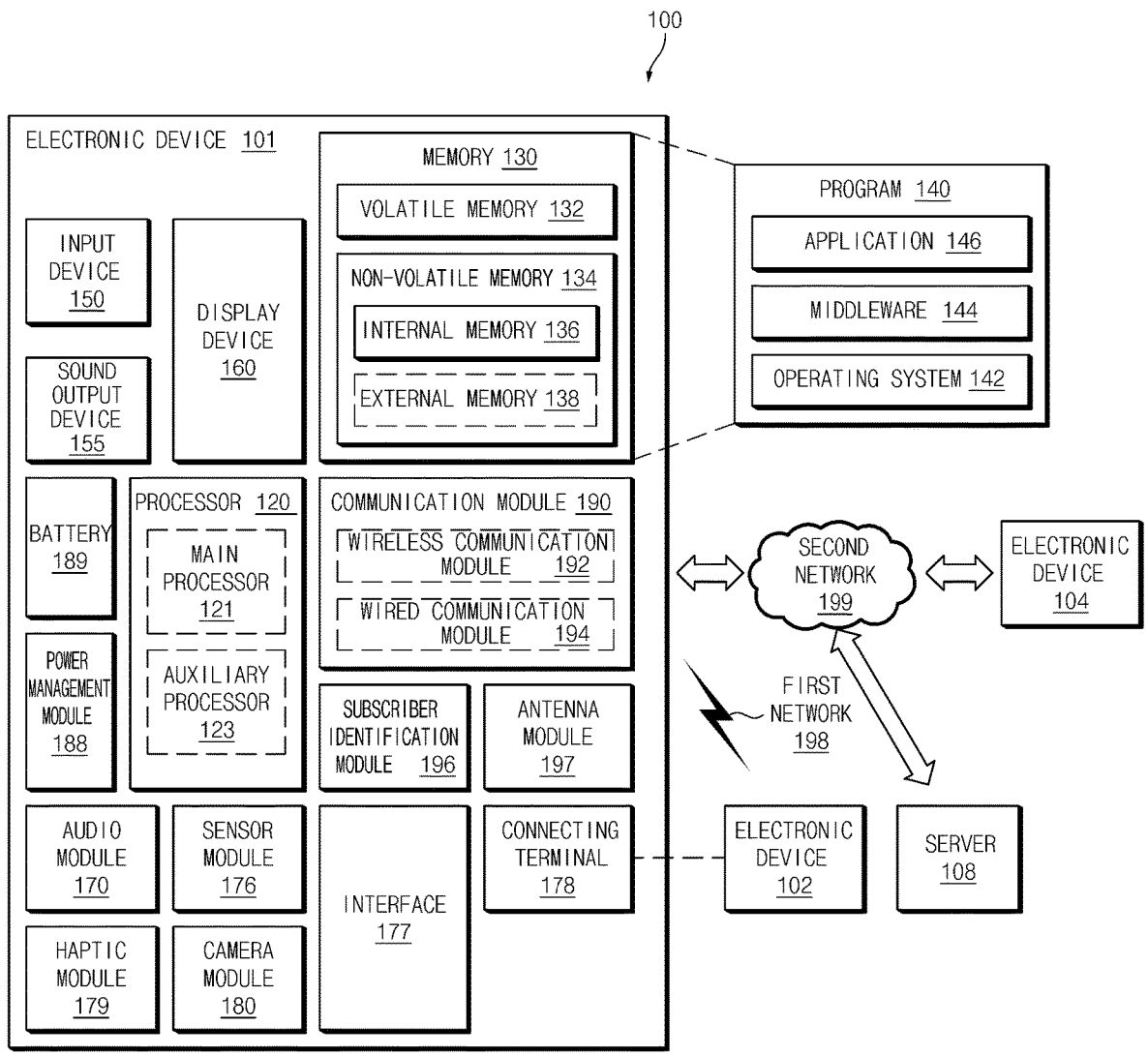
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 comprising processing circuitry may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 comprising processing circuitry may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Any of the embodiment(s) described herein may be used in conjunction with any other embodiment(s) described herein.

Figure 2:
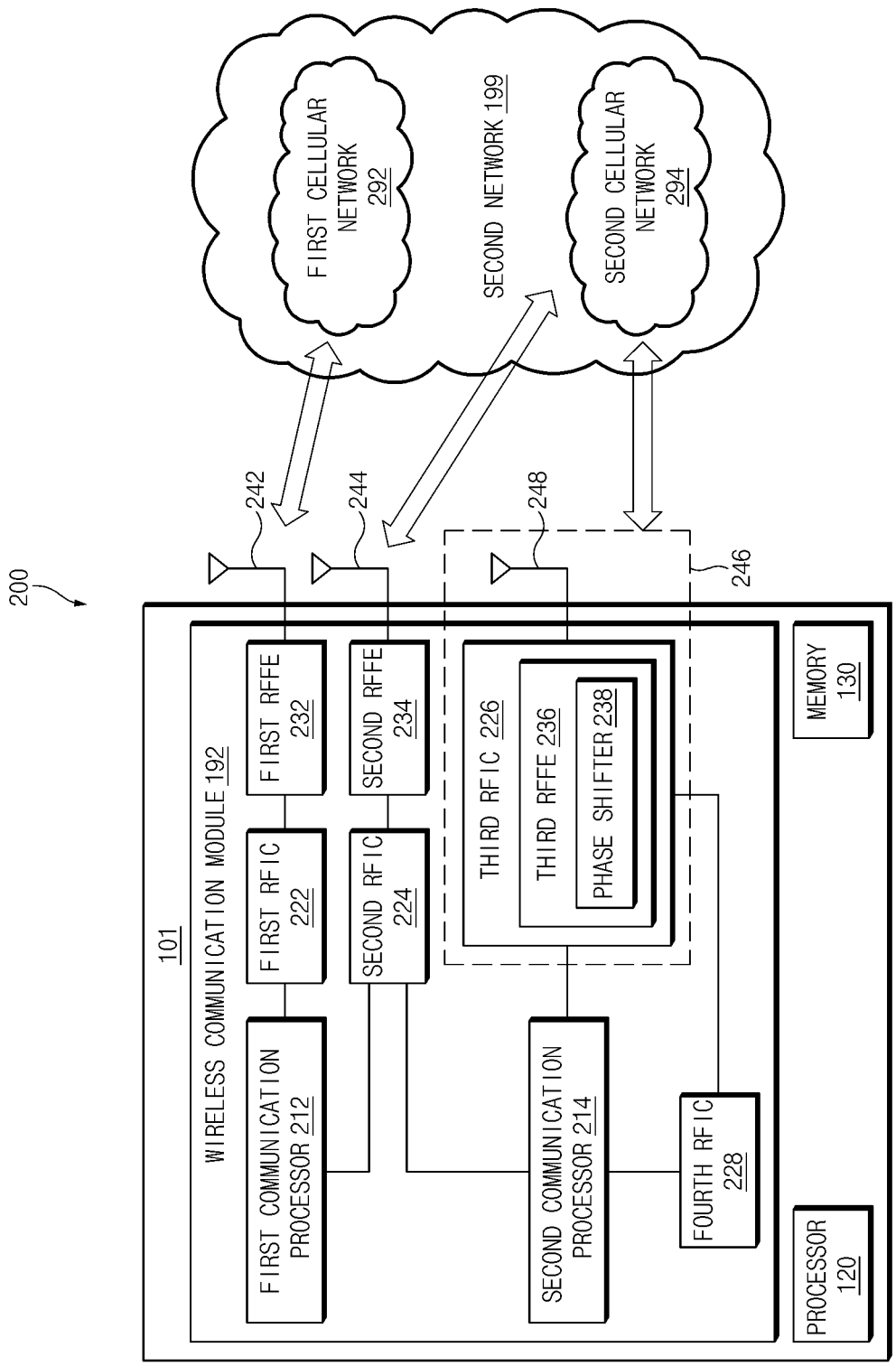
FIG. 2 is a block diagram of an electronic device supporting legacy network communication and 5G network communication, according to various embodiments.

FIG. 2 is a block diagram 200 of the electronic device 101 supporting legacy network communication and 5G network communication, according to various embodiments. Referring to FIG. 2, the electronic device 101 may include a first communication processor 212 comprising processing circuitry, a second communication processor 214 comprising processing circuitry, a first radio frequency integrated circuit (RFIC) 222, a second RFIC 224, and a third RFIC 226, a fourth RFIC 228, a first radio frequency front end (RFFE) 232, a second RFFE 234, a first antenna module 242 comprising at least one antenna, a second antenna module 244 comprising at least one antenna, and an antenna(s) 248. The electronic device 101 may further include the processor 120 comprising processing circuitry and the memory 130. The second network 199 may include a first cellular network 292 and/or a second cellular network 294. According to an example embodiment, the electronic device 101 may further include at least one of the components illustrated in FIG. 1, and the second network 199 may further include at least one other network. According to an example embodiment, the first communication processor 212, the second communication processor 214, the first RFIC 222, the second RFIC 224, the fourth RFIC 228, the first RFFE 232, and the second RFFE 234 may be included in and/or make up at least a part of a wireless communication module 192. According to an example embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various example embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various example embodiments, the second cellular network 294 may be a 5G network defined by 3GPP. Additionally, according to an embodiment, the first communication processor 212 and/or the second communication processor 214 may support the establishment of a communication channel corresponding to another specified band (e.g., approximately 6 GHz or less) among bands to be used for wireless communication with the second cellular network 294, and 5G network communication through the established communication channel. According to an example embodiment, the first communication processor 212 and the second communication processor 214 may be implemented in a single chip or a single package. According to various example embodiments, the first communication processor 212 and/or the second communication processor 214 may be formed with the processor 120, the coprocessor 123 of FIG. 1, and/or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna(s) (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna(s) (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 and/or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna(s) (e.g., the antenna 248), and may be preprocessed through the third RFFE 236. For example, the third RFFE 236 may perform preprocessing of the signal using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 comprising communication circuitry and/or the processor 120 comprising processing circuitry may be disposed on a first substrate (e.g., a main PCB). In this case, the third RFIC 226 may be disposed in a partial region (e.g., the lower surface) of a second substrate (e.g., a sub PCB) separate and/or different from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality and/or speed of communication with the second cellular network 294 (e.g., 5G network).

The second cellular network 294 (e.g., 5G network) may be operated independently (e.g., Stand-Alone (SA)) from the first cellular network 292 (e.g., a legacy network) and/or operated to be connected to (e.g., Non-Stand Alone (NSA)) the first cellular network 292 (e.g., a legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) and/or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
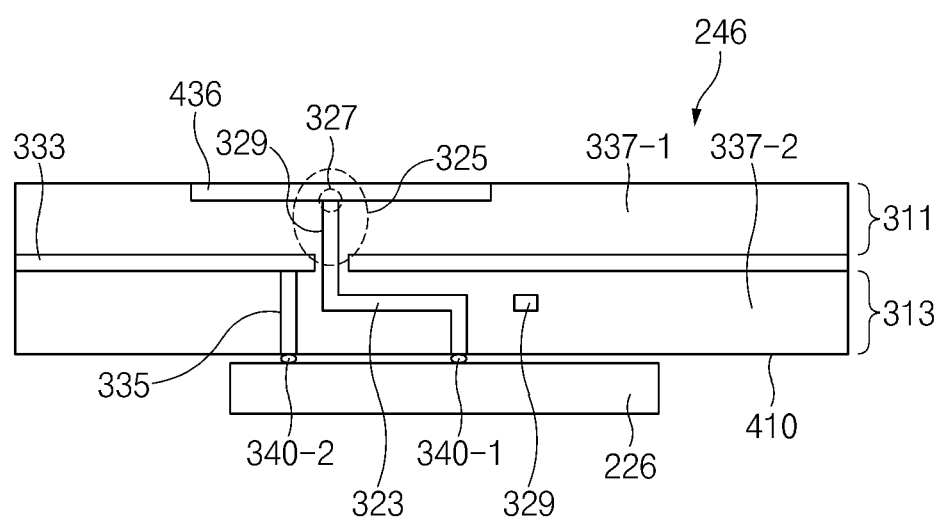
FIG. 3 illustrates a cross-section along line B-B' of a third antenna module of FIG. 4.
Figure 4:
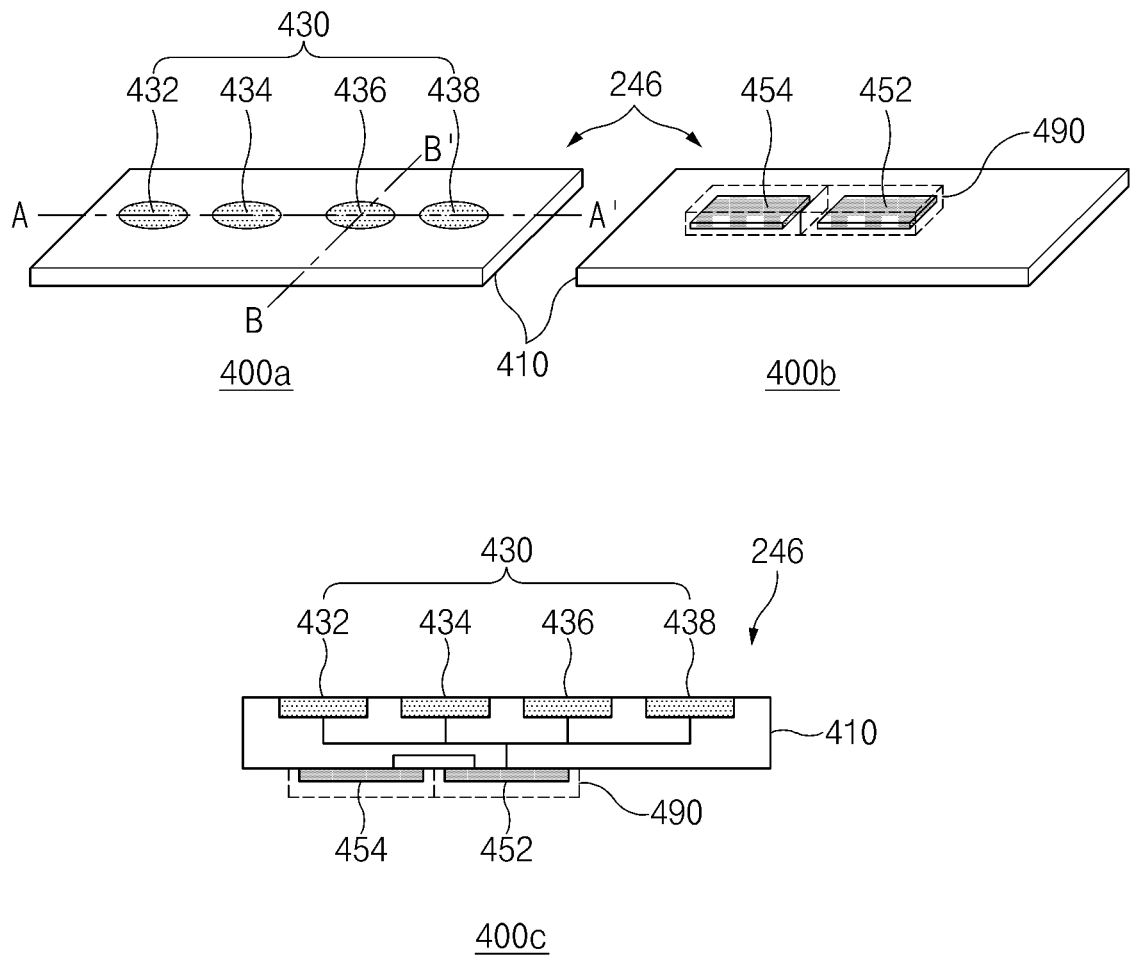
FIG. 4 illustrates an embodiment of a structure of the third antenna module described with reference to FIG. 2.

FIG. 3 illustrates a cross-section taken along line B-B' of the third antenna module 246 of 400a of FIG. 4. A printed circuit board 410 of the illustrated embodiment may include an antenna layer 311 and a network layer 313.

The antenna layer 311 may include at least one dielectric layer 337-1, and an antenna element(s) 436 and/or a feeding unit 325 formed on the outer surface of or inside of the dielectric layer. The feeding unit 325 may include a feeding point 327 and/or a feeding line 329.

The network layer 313 may include at least one dielectric layer 337-2, at least one ground layer 333 formed on the outer surface of or inside of the dielectric layer 337-2, at least one conductive via 335, a transmission line 323, and/or a signal line 329.

In addition, in the example illustrated embodiment, the third RFIC 226 may be electrically connected to the network layer 313, for example, through first and/or second connecting portions (e.g., solder bumps) 340-1 and/or 340-2. In certain example embodiments, various connecting structures (e.g., solder and/or ball grid array (BGA)) may be used instead of the solder bumps connecting portions. The third RFIC 226 may be electrically connected to the antenna element 436 via a first connecting portion 340-1, the transmission line 323, and the feeding unit 325. The third RFIC 226 may also be electrically connected to the ground layer 333 via the second connecting portion 340-2 and the conductive via 335. Although not illustrated, the third RFIC 226 may also be electrically connected to the module interface mentioned above via the signal line 329.

FIG. 4 illustrates, for example, an example embodiment of a structure of the third antenna module 246 described with reference to FIGS. 2-3. 400a of FIG. 4 is a perspective view of the third antenna module 246 as viewed from one side, and 400b of FIG. 4 is a perspective view of the third antenna module 246 as viewed from the other side. 400c of FIG. 4 is a cross-sectional view at A-A' of the third antenna module 246.

Referring to FIG. 4, in an example embodiment, the third antenna module 246 may include a printed circuit board 410, an antenna array 430, a radio frequency integrated circuit (RFIC) 452, and a power manage integrated circuit (PMIC) 454, and a module interface (not shown). The third antenna module 246 may further optionally include a shielding member 490. In other embodiments, at least one of the aforementioned parts may be omitted, or at least two of the parts may be integrally formed.

The printed circuit board 410 may include a plurality of conductive layers, and a plurality of non-conductive layers alternately stacked with the conductive layers. The printed circuit board 410 may provide electrical connection between various electronic components disposed on the printed circuit board 410 and/or outside, using wires and conductive vias formed on the conductive layer.

The antenna array 430 (e.g., 248 in FIG. 2) may include a plurality of antenna elements 432, 434, 436, and 438 arranged to form a directional beam. The antenna elements may be formed on a first surface of the printed circuit board 410 as illustrated. According to an example embodiment, the antenna array 430 may be formed inside the printed circuit board 410. According to certain example embodiments, the antenna array 430 may include a plurality of antenna arrays (e.g., a dipole antenna array and/or a patch antenna array) of the same or different shape or type.

The RFIC 452 (e.g., the third RFIC 226 in FIG. 2) may be disposed in another region of the printed circuit board 410 (e.g., a second surface opposite to the first surface), spaced apart from the antenna array 430. The RFIC 452 may be configured to process a signal of a selected frequency band that is transmitted and received via the antenna array 430. According to an embodiment, upon transmission, the RFIC 452 may convert a baseband signal obtained from a communication processor comprising processing circuitry (not illustrated) into an RF signal of a specified band. Upon reception, the RFIC 452 may convert an RF signal received via the antenna array 430 into a baseband signal and transmit the converted signal to the communication processor.

According to an example embodiment, upon transmission, the RFIC 452 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 452 may down-convert the RF signal obtained via the antenna array 430 into an IF signal, and transmit the converted signal to the IFIC.

The PMIC 454 may be disposed in another partial region (e.g., the second surface) of the printed circuit board 410, spaced apart from the antenna array. The PMIC 454 may receive a voltage from a main PCB (not shown) and provide power required for various components (e.g., the RFIC 452) on antenna modules.

The shielding member 490 may be disposed on a part (e.g., the second surface) of the printed circuit board 410 in order to electromagnetically shield at least one of the RFIC 452 and the PMIC 454. According to an embodiment, the shielding member 490 may include a conductive shield can.

Although not illustrated, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 452 and/or the PMIC 454 of the third antenna module 246 may be electrically connected to the printed circuit board.

Figure 5:
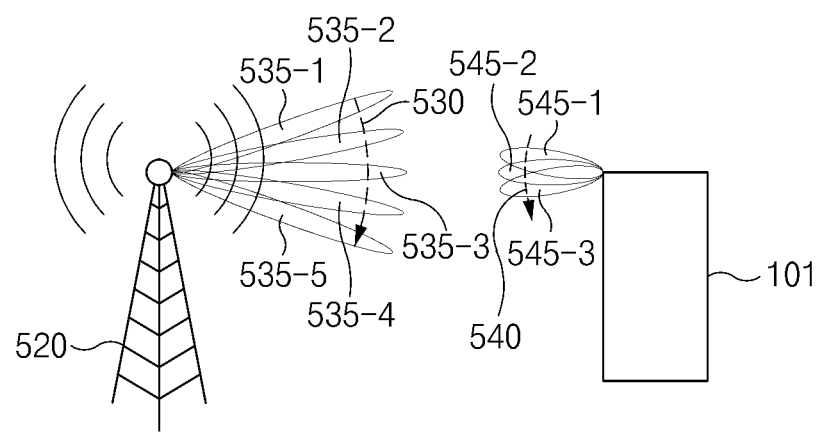
FIG. 5 illustrates an embodiment of an operation for a wireless communication connection between a base station and an electronic device.

FIG. 5 illustrates an example embodiment of an operation for wireless communication connection between a base station 520 and the electronic device 101 using a directional beam for wireless connection in the second network 294 (e.g., the 5G network) of FIG. 2. The base station (gNodeB (gNB), transmission reception point (TRP)) 520 may perform a beam detection operation with the electronic device 101 for wireless communication connection. For beam detection, the base station 520 may sequentially transmit a plurality of transmit beams, for example, first to fifth transmit beams 535-1 to 535-5 having different directions, thereby making it possible to perform at least one transmit beam sweeping 530.

The first to fifth transmit beams 535-1 to 535-5 may include at least one synchronization sequences (SS)/physical broadcast channel (PBCH) block (SS/PBCH Block). The SS/PBCH Block may be used to periodically measure a channel or beam strength of the electronic device 101.

In an example embodiment, the first to fifth transmit beams 535-1 to 535-5 may include at least one channel state information-reference signal (CSI-RS). The CSI-RS is a reference signal flexibly set by the base station 520 and may be transmitted periodically, semi-persistently and/or aperiodically. The electronic device 101 may measure a channel or beam strength using the CSI-RS.

The transmit beams may form a radiation pattern having a selected beam width. For example, the transmit beams may have a broad radiation pattern having a first beam width or a sharp radiation pattern having a second beam width sharper than the first beam width. For example, transmit beams including SS/PBCH block may have a broader radiation pattern than transmit beams including CSI-RS.

The electronic device 101 may perform receive beam sweeping 540 while the base station 520 performs the transmit beam sweeping 530. For example, while the base station 520 performs first transmit beam sweeping 530, the electronic device 101 may fix a first receive beam 545-1 in a first direction to receive a signal of an SS/PBCH block transmitted in at least one of the first to fifth transmit beams 535-1 to 535-5. While the base station 520 performs second transmit beam sweeping 530, the electronic device 101 may fix a second receive beam 545-2 in a second direction to receive a signal of an SS/PBCH block transmitted in one or more of the first to fifth transmit beams 535-1 to 535-5. In this way, the electronic device 101 may select a communicable receive beam (e.g., the second receive beam 545-2) and a communicable transmit beam (e.g., the third transmit beam 535-3) based on the result of the signal reception operation through the receive beam sweeping 540.

As described above, after the communicable beams for receiving and transmitting are determined, the base station 520 and the electronic device 101 may transmit and/or receive basic information for cell setting, and based on the information, set information for additional beam operation. For example, the beam operation information may include detailed information on a set beam, SS/PBCH Block, CSI-RS, or setting information on an additional reference signal.

In addition, the electronic device 101 may continuously monitor the channel and the strength of the beam using at least one of the SS/PBCH Block and CSI-RS included in the transmit beam. The electronic device 101 may adaptively select a beam having good beam quality using the monitoring operation. Optionally, when a communication is disconnected due to movement of the electronic device 101 or blocking of a beam, the above-mentioned beam sweeping operation may be performed again to determine a communicable beam.

Figure 6:
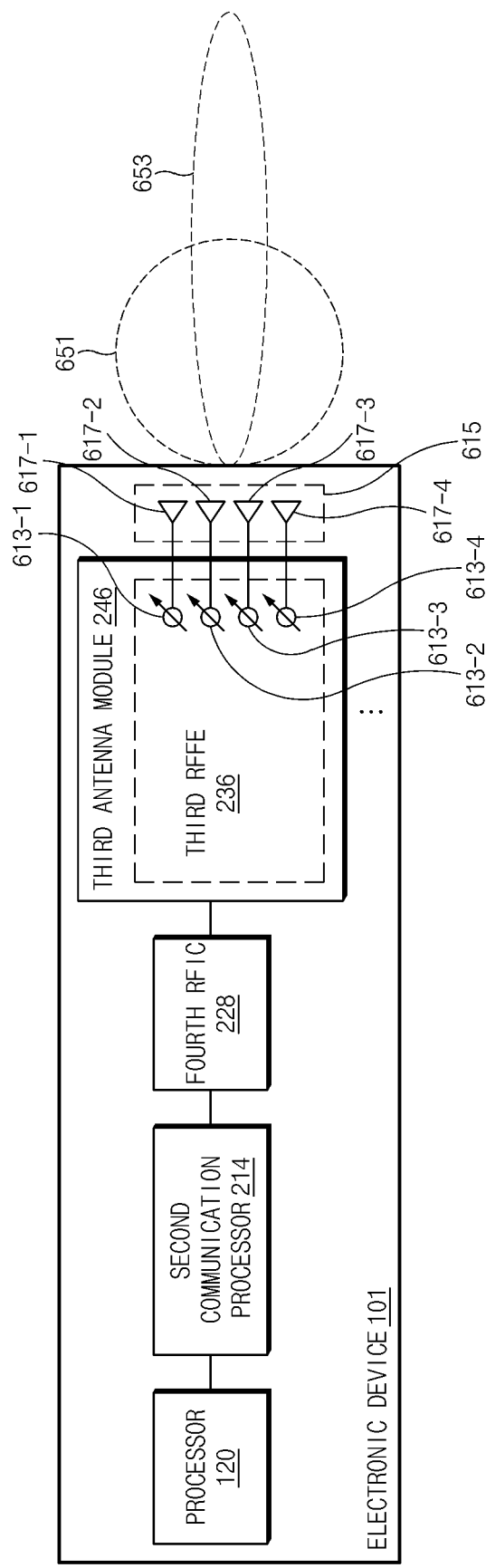
FIG. 6 illustrates a block diagram of an electronic device (101) for 5G network communication, according to an embodiment.

FIG. 6 illustrates a block diagram of the electronic device 101 for 5G network communication, according to an example embodiment. The electronic device 101 may include various components illustrated in FIG. 2; however, for brief description, FIG. 6 illustrates the electronic device 101 as including the processor 120, the second communication processor 214, the fourth RFIC 228, and at least one third antenna module 246.

In the illustrated embodiment, the third antenna module 246 may include first to fourth phase shifters 613-1 to 613-4 (e.g., the phase shifter 238 in FIG. 2) and/or first to fourth antenna elements 617-1 to 617-4 (e.g., the antenna 248 in FIG. 2). Each of the first to fourth antenna elements 617-1 to 617-4 may be electrically connected to one of the first to fourth phase shifters 613-1 to 613-4 individually. The first to fourth antenna elements 617-1 to 617-4 may form at least one antenna array 615.

The second communication processor 214 may control the first to fourth phase shifters 613-1 to 613-4, thereby controlling the phases of the transmitted and/or received signals through the first to fourth antenna elements 617-1 to 617-4, which makes it possible to generate a transmit beam and/or a receive beam in a selected direction.

According to an embodiment, the third antenna module 246 may form a beam 651 of the broad radiation pattern (hereinafter, referred to as a 'broad beam') or a beam 653 of the sharp radiation pattern (hereinafter, referred to as a 'sharp beam') as mentioned above, depending on the number of the used antenna elements. For example, the third antenna module 246 may form the sharp beam 653 when all of the first to fourth antenna elements 617-1 to 617-4 are used, and form the broad beam 651 when only the first antenna element 617-1 and/or the second antenna element 617-2 is/are used. The broad beam 651 has a broader coverage than the sharp beam 653, but has a small antenna gain, and thus it may be more effective in searching for a beam. On the other hand, the sharp beam 653 has a narrower coverage than the broad beam 651, but has a higher antenna gain, and thus it may improve communication performance.

According to an embodiment, the second communication processor 214 may utilize a sensor module 176 (e.g., a 9-axis sensor, grip sensor, or GPS) for beam search. For example, the electronic device 101 may adjust a beam search position and/or a beam search period based on the position and/or movement of the electronic device 101 using the sensor module 176. For another example, when the electronic device 101 is gripped by a user, an antenna module having better communication performance may be selected from among the plurality of third antenna modules 246 by identifying the gripping part of the user using a grip sensor.

Figure 7:
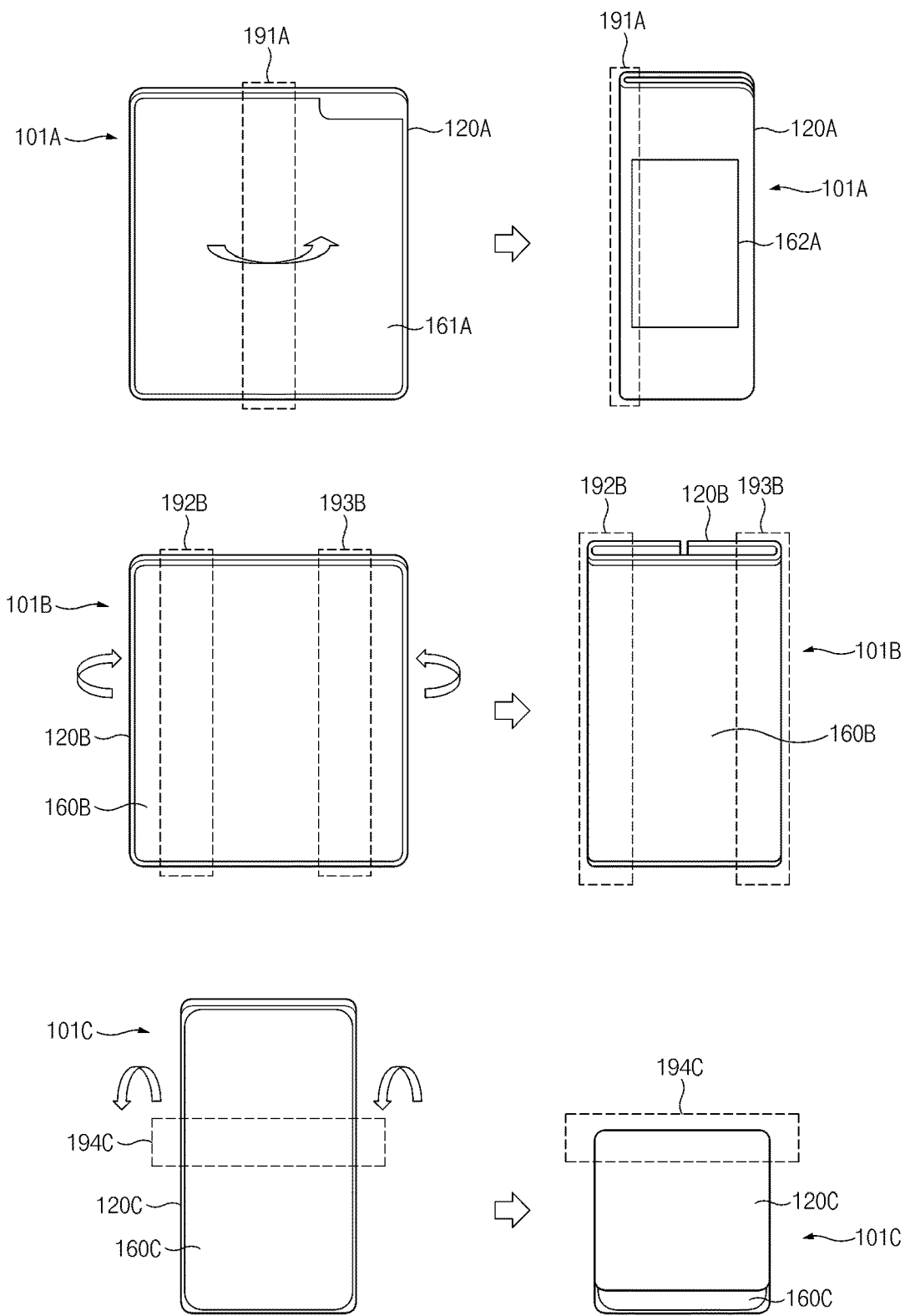
FIG. 7 illustrates electronic devices of which the shapes change according to various embodiments.

FIG. 7 illustrates electronic devices of which the shapes change according to various example embodiments.

According to various example embodiments, the form of the electronic device 201 may be physically changed with folding/unfolding. For example, the electronic device may include a housing and a display having flexibility in at least some portions. Around the flexible portion of the electronic device, the electronic device may be folded (e.g., open) or unfolded (e.g., closed). For example, a portion of the electronic device having flexibility may be referred to as a folded portion. The folded portion refers to a portion (e.g., a hinge) or a region in which the form of the electronic device is to be changed, and is not limited to a specific structure.

According to an embodiment, a first electronic device 101A (e.g., the electronic device 101 of FIG. 1) may be folded left and right. For example, the first electronic device 101A may be folded around at least a folded portion 191A. For example, the first electronic device 101A may include a first display 161A (e.g., the display device 160 of FIG. 1) and a housing 120A, which have flexibility at a portion corresponding to the folded portion 191A. The first electronic device 101A may be folded left and right around the folded portion 191A. The first electronic device 101A may include a second display 162A (e.g., the display device 160 of FIG. 1) exposed to the outside in a folded state. In FIG. 7, the first electronic device 101A is illustrated as an in-fold electronic device in which the first display 161A is folded inward; however, embodiments of the present disclosure are not limited thereto. For example, the first electronic device 101A may be an out-fold electronic device or an electronic device that supports both in-fold and out-fold. For another example, the first display 161A is illustrated as a single display; however, embodiments of the present disclosure are not limited thereto. The first electronic device 101A may include a plurality of displays divided around the folded portion 191A. The housing 120A may also include a plurality of housings divided around the folded portion 191A. For another example, the first electronic device 101A may be a combination of a plurality of electronic devices coupled to be folded around the folded portion 191A. In this case, a plurality of electronic devices may be coupled to each other by a separate structure (e.g., a housing or a hinge).

According to an embodiment, a second electronic device 101B (e.g., the electronic device 101 of FIG. 1) may be folded left and right around a plurality of axes. For example, the second electronic device 101B may include a display 160B (e.g., the display device 160 of FIG. 1) and a housing 120B that have flexibility at least at portions corresponding to a second folded portion 192B and a third folded portion 193B. The second electronic device 101B may be folded left and right around the second folded portion 192B and the third folded portion 193B. In FIG. 7, the second electronic device 101B is illustrated as an out-fold electronic device in which the display 160B is folded outward; however, embodiments of the present disclosure are not limited thereto. For example, the second electronic device 101B may be in-folded at the second folded portion 192B and/or the third folded portion 193B. For another example, the display 160B is illustrated as a single display; however, embodiments of the present disclosure are not limited thereto. The second electronic device 101B may include a plurality of displays divided based on at least one of the first folded portion 192B and the second folded portion 193B. The housing 120B may also include a plurality of housings divided based on at least one of the first folded portion 192B and the second folded portion 193B. For another example, the second electronic device 101B may be a combination of a plurality of electronic devices coupled to be folded around the first folded portion 191B and the second folded portion 193B. In this case, for example, a plurality of electronic devices may be coupled to each other by a separate structure (e.g., a housing or a hinge).

According to an example embodiment, a third electronic device 101C (e.g., the electronic device 101 of FIG. 1) may be folded up and down. For example, the third electronic device 101C may include a display 160C (e.g., the display device 160 of FIG. 1) and a housing 120C, which have flexibility at least at a portion corresponding to a fourth folded portion 194C. The third electronic device 101B may be folded up and down around the fourth folded portion 194C. In FIG. 7, the third electronic device 101C is illustrated as an in-fold electronic device in which the display 160B is folded inward; however, embodiments of the present disclosure are not limited thereto. For example, the third electronic device 101C may be out-folded, or in-folded and out-folded, at the third folded portion 193C. For another example, the display 160C is illustrated as a single display; however, embodiments of the present disclosure are not limited thereto. The third electronic device 101C may include a plurality of displays divided based on the fourth folded portion 194C. The housing 120C may also include a plurality of housings divided based on the folded portion 194C. For another example, the third electronic device 101C may be a combination of a plurality of electronic devices coupled to be folded around the folded portion 194C. In this case, a plurality of electronic devices may be coupled to each other by a separate structure (e.g., a housing or a hinge).

Changes in the physical shape of the electronic devices (e.g., 101A, 101B, and 101C) illustrated in FIG. 7 are exemplary, and embodiments of the present disclosure are not limited thereto. For example, the electronic device may be folded or unfolded about any axis.

Figure 8:
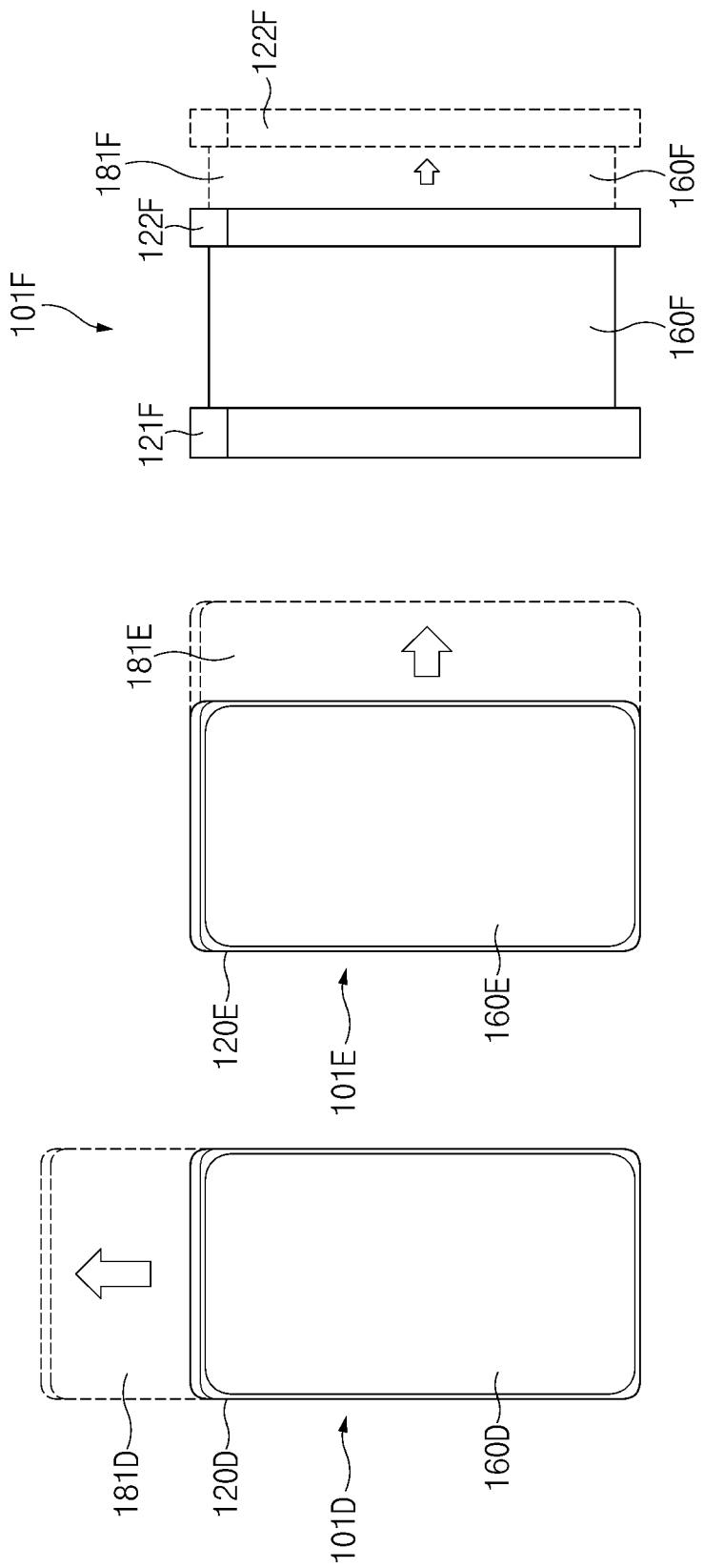
FIG. 8 illustrates electronic devices of which the shapes change according to various embodiments.

FIG. 8 illustrates electronic devices of which the shapes change according to various example embodiments.

According to various example embodiments, the form of an electronic device may be physically changed with extension/retraction of the housing of the electronic device. For example, the electronic device may include a housing and/or a display of which at least a portion is able to extend. For example, a portion of the electronic device may be slid or rolled so that the electronic device may be extended (e.g., open) or retracted (e.g., closed). When the shape of the electronic device is changed from a first shape to a second shape, an extension part refers to a portion or region corresponding to the difference between the first shape and the second shape, and is not limited to a specific structure.

According to an example embodiment, a fourth electronic device 101D (e.g., the electronic device 101 of FIG. 1) may include an extension part 181D that extends/retracts up and down. For example, at least a portion of a housing 120D of the fourth electronic device 101D may include the extension part 181D that is able to extend upward of the fourth electronic device 101D. For example, the extension part 181D is a part of the housing 120D, and may extend the housing 120D of the fourth electronic device 101D by moving relatively upward with respect to the other part of the housing 120D. The extension part 181D may move independently of the display 160D (e.g., the display device 160 of FIG. 1). For example, the extension part 181D may be drawn upward relative to the display 160D. For another example, the extension part 181D may be drawn downward relative to the display 160D. According to an embodiment, the extension part 181D may include a camera module. For example, the camera module may be configured to rotate with the movement of the extension part 181D.

According to an example embodiment, a fifth electronic device 101E (e.g., the electronic device 101 of FIG. 1) may include an extension part 181E that extends/retracts left and right. For example, at least a portion of a housing 120E of the fifth electronic device 101E may include an extension part 181E that is able to extend in the right direction of the fifth electronic device 101E. For example, the extension part 181E may move independently of the display 160E (e.g., the display device 160 of FIG. 1). In this case, a portion of the housing 120E may be drawn beyond one side relative to the display 160E, thereby forming the extension part 181E. For another example, the extension part 181E may move together with the display 160E. In this case, a portion of the housing 120E and the display 160E may relatively protrude beyond one side, thereby forming the extension part 181E. According to an embodiment, the extension part 181E may include a camera module. For example, the camera module may be configured to rotate with the movement of the extension part 181E.

According to an example embodiment, a sixth electronic device 101F (e.g., the electronic device 101 of FIG. 1) may include an extension part 181F that extends/retracts left and right. For example, a display 160F (e.g., the display device 160 of FIG. 1) of the sixth electronic device 101F may be a rollable display. For example, the display 160F may be rolled and accommodated in a first housing 121F. For example, the display 160F may extend between the first housing 121F and a second housing 122F by being unrolled. The extension part 181F may be generated by unrolling the display 160F.

Changes in the physical shape of the electronic devices (e.g., 101D, 101E, and 101F) illustrated in FIG. 8 are exemplary, and embodiments of the present disclosure are not limited thereto. For example, the electronic device may extend or retract in any direction.

With regard to the first electronic device 101A, the second electronic device 101B, the third electronic device 101C, the fourth electronic device 101D, the fifth electronic device 101E, or the sixth electronic device 101F of FIGS. 7 and 8, changes in the shapes of various electronic devices have been described. The changes in shape are exemplary, and embodiments of the present disclosure are not limited thereto.

For example, the electronic devices of FIGS. 7 and 8 may include an antenna module for 5G mobile communication (e.g., the third antenna module 246 of FIG. 6). In 5G mobile communication using a frequency band of 6 GHz or higher, the change in the shape of an electronic device may affect characteristics (e.g., a radiation direction and/or a shielding area) of the antenna module. For example, the characteristics of the antenna module may be changed by changing the position or orientation of the antenna module with the change in the shape of the electronic device. For the electronic devices of FIG. 7, the characteristics of the antenna module may be changed with the open/close state of the electronic devices. For the electronic devices of FIG. 8, the characteristics of the antenna module may be changed with the extension/retraction of the electronic devices. For example, when the antenna module is positioned in the extension part, characteristics of the antenna module may be changed with the extension/retraction of the extension part. For another example, the characteristics of the antenna module may be changed with the change in the internal environment of the electronic device by extension/retraction. Since the characteristics of the antenna module may be changed with the change in the shape of the electronic device, the electronic device may perform communication in consideration of the change in the characteristics of the antenna module.

Hereinafter, various example embodiments will be described with a focus on the first electronic device 101A, the second electronic device 101B, the third electronic device 101C, the fourth electronic device 101D, the fifth electronic device 101E, or the sixth electronic device 101F of FIGS. 7 and 8. The following embodiments may be similarly applied to an electronic device (e.g., the electronic device 101 of FIG.

Figure 9:
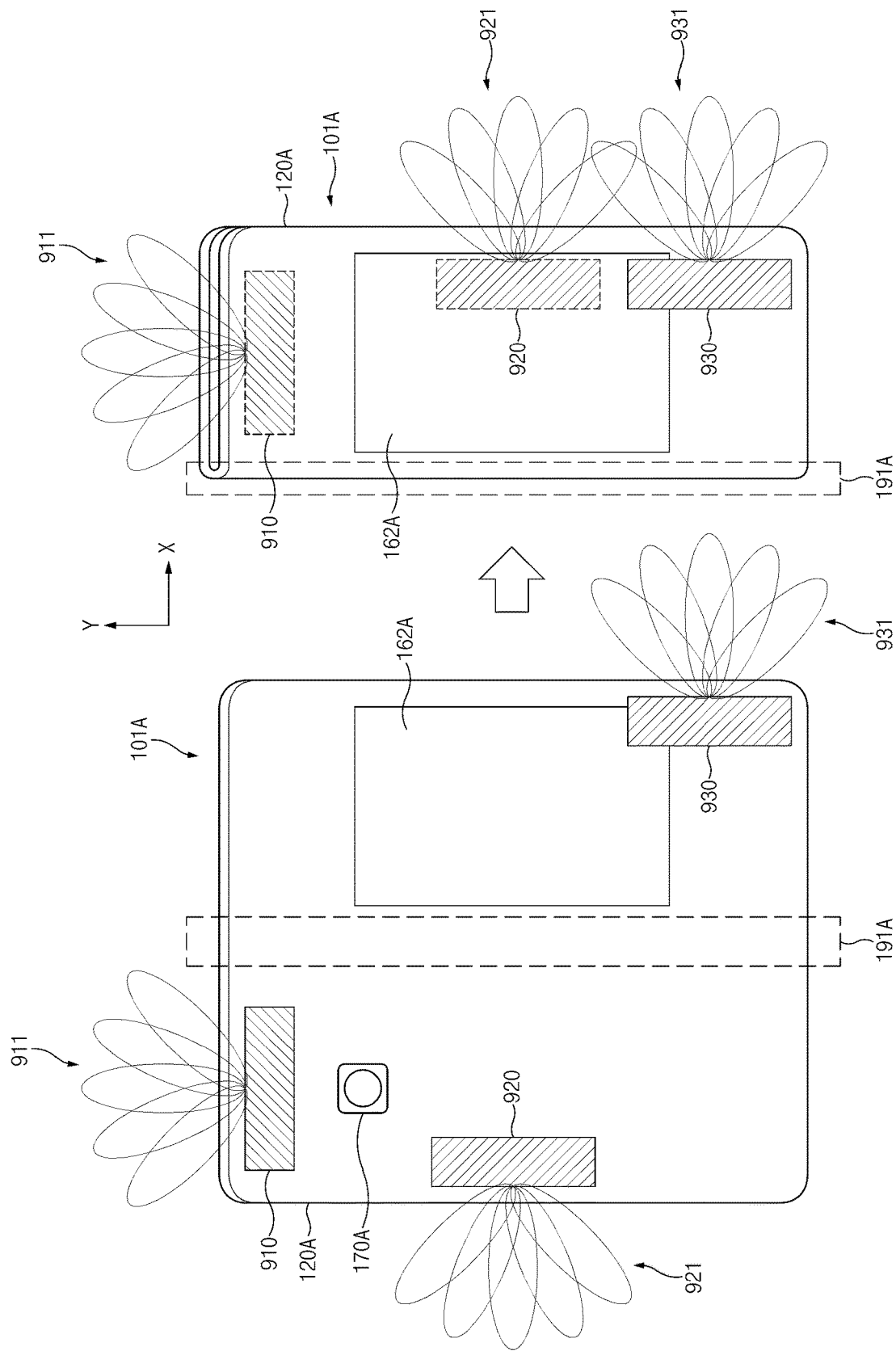
FIG. 9 illustrates an antenna module arrangement of an electronic device according to an example.

FIG. 9 illustrates an antenna module arrangement of an electronic device according to an example.

FIG. 9 illustrates the arrangement of an antenna module (e.g., the second antenna module 246 of FIG. 2) of the first electronic device 101A of FIG. 7, according to an example embodiment.

In the example of FIG. 9, the rear surface of the first electronic device 101A is illustrated. For example, on the rear surface of the first electronic device 101A, a camera 170A and the second display 162A may be viewable through the housing 120A. According to an embodiment, the first electronic device 101A may include a plurality of antenna modules 910, 920, and 930. For example, each of the first antenna module 910, the second antenna module 920, and the third antenna module 930 may correspond to the second antenna module 246 of FIG. 2. Each of the plurality of antenna modules 910, 920, and 930 may include at least one array antenna (e.g., the array antenna 430 of FIG. 4). Each of the at least one array antenna may include a plurality of conductive patterns (e.g., antenna elements 432, 434, 436, and 438 of FIG. 4). Each of the at least one array antenna may be operatively coupled to a communication circuit (e.g., the third RFIC 226 and the third RFFE 236 of FIG. 2) and at least one processor (e.g., the second communication processor 214 and/or the fourth RFIC 228 of FIG. 2). At least one processor comprising processing circuitry may perform beamforming using at least one array of antenna modules.

According to an example embodiment, the first electronic device 101A may perform beamforming based on a beam book. For example, the beam book may include information on beams stored in a memory (e.g., the memory 130 of FIG. 1). The beam book may include beam information for operating the antenna modules of the first electronic device 101A. For example, the beam book may include beam identification information (e.g., beam ID) corresponding to each beam. The beam book may include, for example, polarization information (e.g., vertical polarization and/or horizontal polarization) and/or target angle information (e.g., vertical plane angle and/or horizontal plane angle) corresponding to each piece of beam identification information. The beam book may include, for example, phase shift information about an antenna module(s) corresponding to each piece of beam identification information and/or each antenna element(s).

According to a comparative example, in the unfolded state of the first electronic device 101A, the first electronic device 101A may include the first antenna module 910 configured to form first beam patterns 911 toward an upper portion (e.g., a +Y direction) of the first electronic device 101A, the second antenna module 920 configured to form second beam patterns 921 to the left (e.g., a −X direction) of the first electronic device 101A, and the third antenna module 930 configured to form third beam patterns 931 to the right (e.g., a +X direction) of the first electronic device 101A. For example, the first electronic device 101A may form the first beam patterns 911, the second beam patterns 921, and/or the third beam patterns 931 based on a specified beam book.

According to the comparative example, in the folded state of the first electronic device 101A, it may be assumed that the same beam book as that in the unfolded state of the first electronic device 101A is used. In this case, the positions of the antenna modules (e.g., 910 and 920) of the first electronic device 101A may be changed. For example, the left and right of the first beam patterns 911 of the first antenna module 910 may be reversed with respect to the unfolded state. The second beam patterns 921 of the second antenna module 920 may be formed to the left (e.g., the +X direction) in a closed state. In this case, a part of the beam coverage of the second antenna module 920 and a part of the beam coverage of the third antenna module 930 may overlap.

According to the comparative example, depending on the change in the shape of the first electronic device 101A, the correlation with the structures around the antenna modules (e.g., 910, 920, and 930) and/or a ground (GND) condition may be changed. In this case, the performance of each of the antenna modules (e.g., 910, 920, and 930) may be changed with the change in the shape of the first electronic device 101A.

According to the comparative example, when the same beam book is used in the unfolded state and the folded state of the first electronic device 101A, the communication state of the first electronic device 101A may be deteriorated due to the change in the position and performance of the antenna modules. According to an example embodiment, the first electronic device 101A may perform communication using different beam books depending on the shape. For example, the first electronic device 101A may perform communication using a first beam book in the unfolded state and may perform communication using a second beam book in the folded state. For example, the first beam book and the second beam book may include at least one different beam (e.g., a beam with at least one different information among beam identification information, polarization information, beam associated antenna module information, or phase shift information about an antenna array).

According to an example embodiment, the first electronic device 101A may identify the state (e.g., the open state or a folded state) using at least one sensor (e.g., the sensor module 176 of FIG. 1). For example, the first electronic device 101A may determine the state of the first electronic device 101A using at least one of a hinge sensor positioned in the folded portion 191A, an acceleration sensor positioned in the housing 120A, and/or a magnetic force sensor positioned in the housing 120A.

Figure 10:
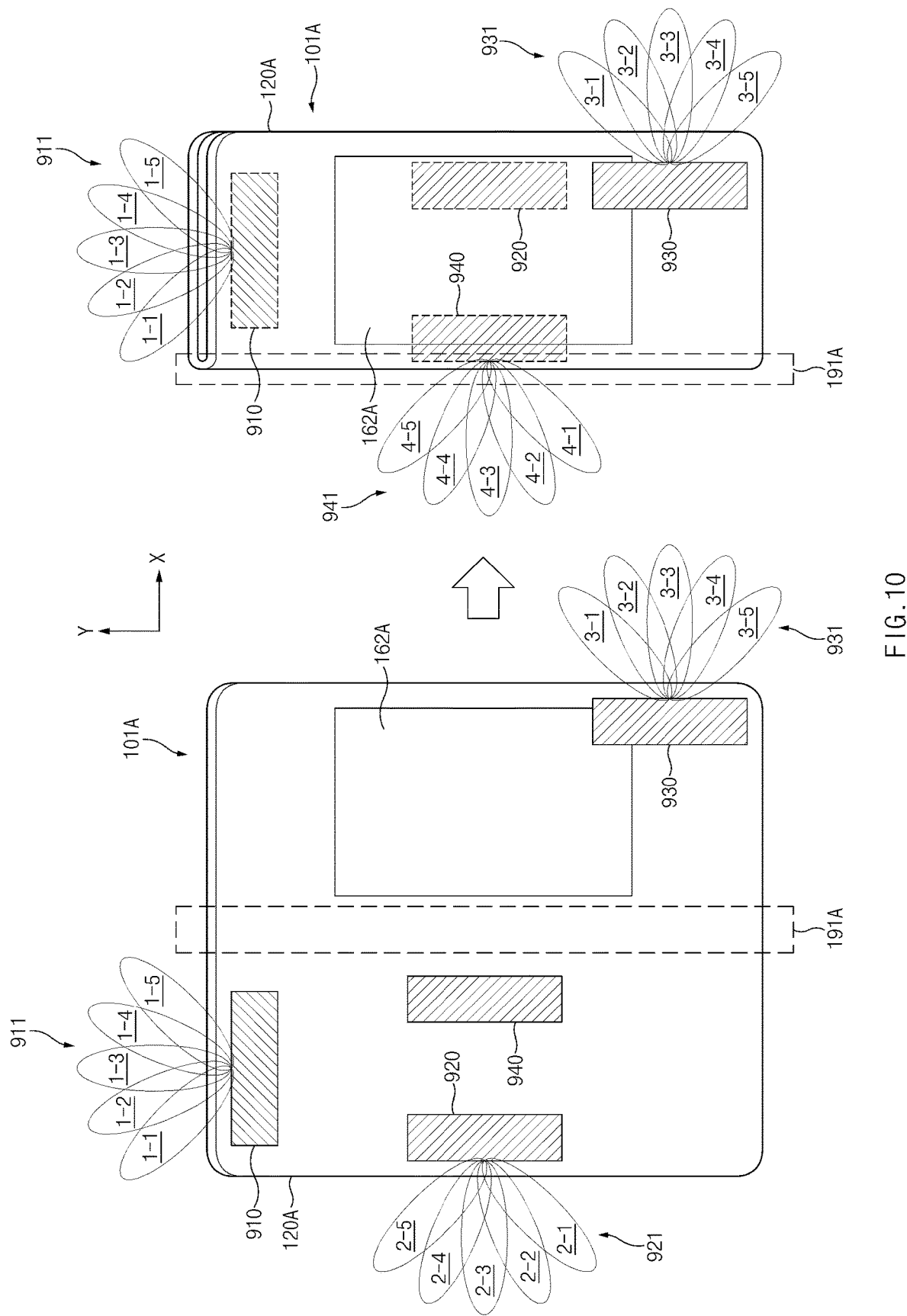
FIG. 10 illustrates beam book operation of an electronic device according to an embodiment.

FIG. 10 illustrates beam book operation of an electronic device according to an example embodiment.

According to various example embodiments, the electronic device (e.g., the electronic device 101 of FIG. 1) may perform communication using different antenna module groups depending on the state of the electronic device. According to an example embodiment, the electronic device may perform communication using antenna modules of a first group in a first state (e.g., an open, unrolled, or unfolded state), and may perform communication using antenna modules of a second group in a second state (e.g., a closed, rolled, or folded state). For example, at least one of the antenna modules of the first group and at least one of the antenna modules of the second group may be different from each other. For example, some of the antenna modules of the electronic device may be in an on state in the folded state and the unfolded state, and some of the antenna modules of the electronic device may be in an on state only in the folded state or the unfolded state.

Referring to FIG. 10, the rear surface of the first electronic device 101A (e.g., the electronic device 101 of FIG. 1) is illustrated. For example, according to an embodiment, the first electronic device 101A may include a plurality of antenna modules 910, 920, 930, and 940. For example, each of the first antenna module 910, the second antenna module 920, the third antenna module 930, and the fourth antenna module 940 may correspond to the second antenna module 246 of FIG. 2. For example, the fourth antenna module 940 may be positioned adjacent (or similarly) to the folded portion 191A. Each of the plurality of antenna modules 910, 920, 930, and 940 may include at least one array antenna (e.g., the array antenna 430 of FIG. 4). Each of the at least one array antenna may include a plurality of conductive patterns (e.g., antenna elements 432, 434, 436, and 438 of FIG. 4). Each of the at least one array antenna may be operatively coupled to a communication circuit (e.g., the third RFIC 226 and the third RFFE 236 of FIG. 2) and at least one processor (e.g., the second communication processor 214 and/or the fourth RFIC 228 of FIG. 2). At least one processor may perform beamforming using at least one array of antenna modules.

According to an example embodiment, in the unfolded state, the first electronic device 101A may perform communication using the first beam book. For example, the first beam book may include beams associated with the antenna modules of the first group (e.g., the first antenna module 910, the second antenna module 920, and the third antenna module 930). In this case, for example, the fourth antenna module 940 may be turned off. For example, the first beam book may include a beam 1-1, a beam 1-2, a beam 1-3, a beam 1-4, and a beam 1-5, which are associated with the first antenna module 910, a beam 2-1, a beam 2-2, a beam 2-3, a beam 2-4, and a beam 2-5, which are associated with the second antenna module 920, and a beam 3-1, a beam 3-2, a beam 3-3, a beam 3-4, and a beam 3-5, which are associated with the third antenna module 930.

According to an embodiment, in the folded state, the first electronic device 101A may perform communication using the second beam book different from the first beam book. For example, the second beam book may include beams associated with the antenna modules of the second group (e.g., the first antenna module 910, the third antenna module 930, and the fourth antenna module 940). In this case, the third antenna module 930 may be turned off (e.g., disconnected from the communication circuit). For example, the second beam book may include the beam 1-1, the beam 1-2, the beam 1-3, the beam 1-4, and the beam 1-5, which are associated with the first antenna module 910, the beam 3-1, the beam 3-2, the beam 3-3, the beam 3-4, and the beam 3-5, which are associated with the third antenna module 930, and a beam 4-1, a beam 4-2, a beam 4-3, a beam 4-4, and a beam 4-5, which are associated with the fourth antenna module 940.

According to an example embodiment, the plurality of antenna modules 910, 920, 930, and 940 may be connected to at least one communication circuit (e.g., the fourth RFIC 228 of FIG. 2). For example, the communication circuit may be connected to a limited number of antenna modules. For example, the plurality of antenna modules 910, 920, 930, and 940 may be selectively connected to the communication circuit depending on the state of the first electronic device 101A. For example, in the unfolded state, the first antenna module 910, the second antenna module 920, and the third antenna module 930 may be connected to the communication circuit, and the fourth antenna module 940 may be disconnected from the communication circuit. For example, the first electronic device 101A may include a switch for selectively connecting at least some of the antenna modules to the communication circuit. For example, the first electronic device 101A may include a switch circuit for selectively connecting the third antenna module 930 or the fourth antenna module 940 to the communication circuit. For example, the plurality of antenna modules 910, 920, 930, and 940 may be selectively enabled depending on the state of the first electronic device 101A. For example, the first electronic device 101A may include at least one switch for selectively enabling or activating at least some of the plurality of antenna modules 910, 920, 930, and 940.

Figure 15:
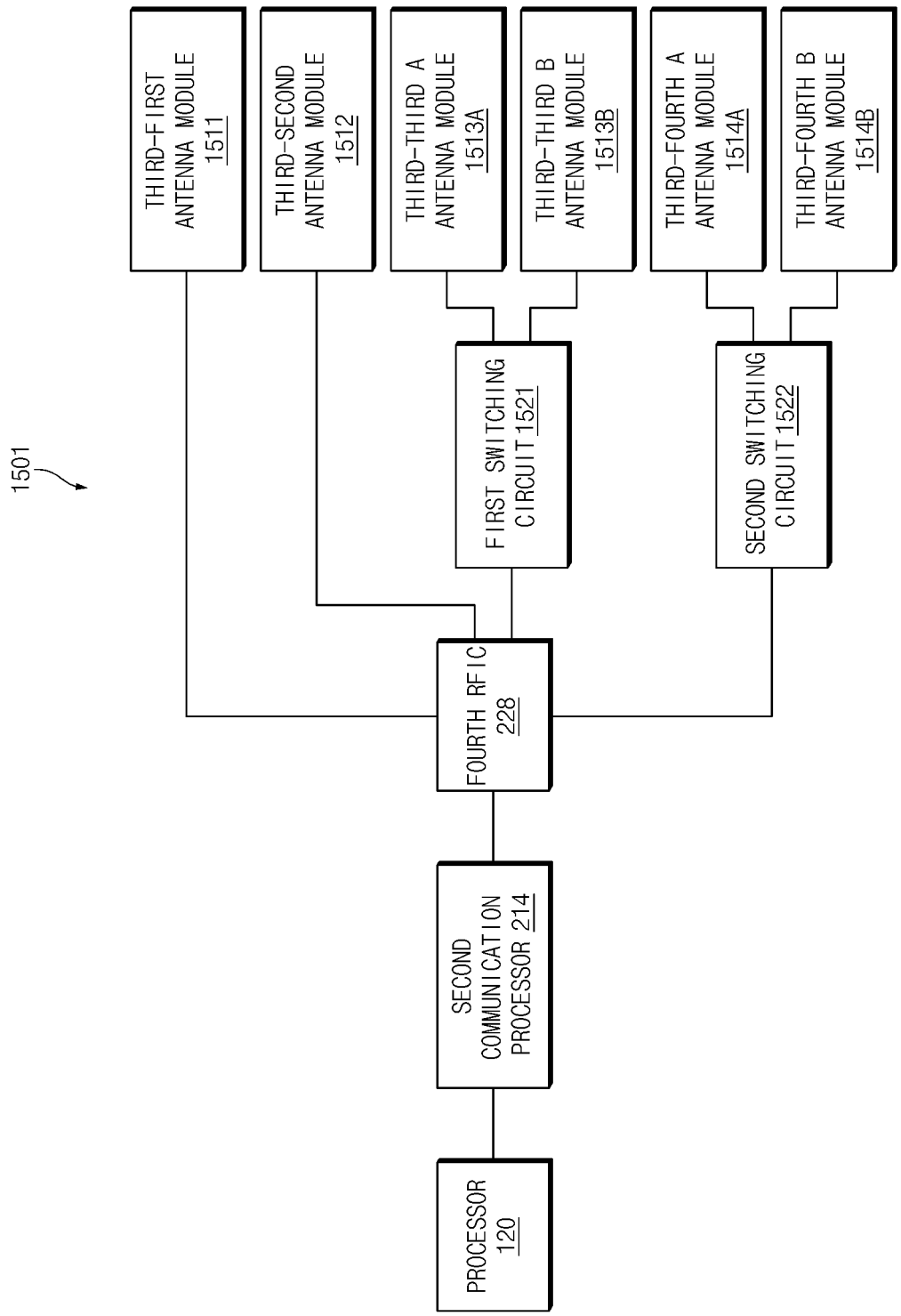
FIG. 15 illustrates an antenna module connecting structure according to an embodiment.

Referring to FIG. 15, a structure of an electronic device for selectively enabling antenna modules according to an embodiment may be described. For example, an electronic device (e.g., the electronic device 101 of FIG. 1) may include a plurality of antenna modules 1511, 1512, 1513A, 1513B, 1514A, and 1514B connected to the fourth RFIC (228) depending on a connecting structure 1501. Each of the plurality of antenna modules may correspond to, for example, the second antenna module 246 of FIG. 6.

In the example of FIG. 15, the fourth RFIC 226 may be selectively connected to at least some of the plurality of antenna modules through a switching circuit. For example, the fourth RFIC 226 may be electrically connected to a third-third A antenna module 1513A or a third-third B antenna module 1513B through the first switching circuit 1521. For example, the second communication processor 214 may control the first switching circuit 1521 to selectively enable or activate the third-third A antenna module 1513A or the third-third B antenna module 1513B. For example, the fourth RFIC 226 may be electrically connected to a third-fourth A antenna module 1514A or a third-fourth B antenna module 1514B through the second switching circuit 1522. For example, the second communication processor 214 may control the second switching circuit 1522 to selectively enable or activate the third-fourth A antenna module 1514A or the third-fourth B antenna module 1514B.

In the connecting structure 1501 of FIG. 15, the electronic device 101 may selectively enable the antenna modules using a switching circuit with the change in the shape of the electronic device 101.

According to an example embodiment, the fourth RFIC 226 may be configured to be connected to a limited number of antenna modules. If the number of antenna modules of the electronic device 101 is increased in consideration of the change in the shape of the electronic device 101, the number of antenna modules of the electronic device 101 may be greater than the number of antenna modules that may be simultaneously connected to the fourth RFIC 226. Accordingly, by selectively connecting at least some of the antenna modules to the fourth RFIC 226 using the switching circuit, the electronic device 101 may satisfy the connection limitation of the fourth RFIC 226.

Referring to FIGS. 10 and 15, for example, the first antenna module 910 may correspond to a third-first antenna module 1511, and the third antenna module 930 may correspond to a third-second antenna module 1512. The first antenna module 910 and the third antenna module 930 may be connected to an IFIC of the first electronic device 101A (e.g., the fourth RFIC 228 of FIG. 15) regardless of the change in the shape of the first electronic device 101A. For example, the second antenna module 920 may correspond to the third-third A antenna module 1513A, and the fourth antenna module 940 may correspond to the third-third B antenna module 1513B. The first electronic device 101A may include a switching circuit corresponding to the first switching circuit 1521 and may enable or activate the second antenna module 920 or the fourth antenna module using the switching circuit. In the example of FIG. 10, the second switching circuit 1522, the third-fourth A antenna module 1514A, and the third-fourth B antenna module 1514B of the connecting structure 1501 of FIG. 15 may be omitted.

According to an example embodiment, the first electronic device 101A may control the antenna modules 910, 920, 930, and 940 based on the change in the shape of the electronic device. For example, in the unfolded state, the first antenna module 910, the second antenna module 920, and the third antenna module 930 may be enabled, and the fourth antenna module 940 may be disabled. For example, in the folded state, the first antenna module 910, the third antenna module 930, and the fourth antenna module 940 may be enabled, and the third antenna module 930 may be disabled. For example, the first electronic device 101A may control enabling/disabling of the second antenna module 920 and/or the fourth antenna module 940 using the switching circuit.

According to an example embodiment, the memory of the first electronic device 101A may store mapping information between the beams of the first beam book and the beams of the second beam book. For example, the beam 2-5 of the first beam book may be mapped to the beam 4-5 of the second beam book. Similarly, the beams 2-1, 2-2, 2-3, and 2-4 of the first beam book are to be mapped to the beams 4-1, 4-2, 4-3, and 4-4 of the second beam book, respectively.

According to an example embodiment, if the shape of the first electronic device 101A is changed during communication using the first beam book, the first electronic device 101A may perform communication using the second beam book. For example, the first electronic device 101A may perform communication using the beam of the second beam book corresponding to the beam of the first beam book based on mapping information about the first beam book and the second beam book. For example, if the first electronic device 101A is changed from the unfolded state to the closed state during communication using the beam 2-3, the first electronic device 101A may perform communication using the beam 4-3 corresponding to the beam 2-3. By performing communication using the mapped beam, the first electronic device 101A may reduce a time for beam searching.

According to an example embodiment, if the shape of the first electronic device 101A is changed during communication using the first beam book, the first electronic device 101A may perform beam searching using the second beam book. For example, the first electronic device 101A may attempt communication using the beam of the second beam book corresponding to the beam of the first beam book based on mapping information about the first beam book and the second beam book. If a communication environment using the mapped beam of the second beam book is less than a threshold value (e.g., if a reference signal reception power is lower than or equal to a threshold power and/or an error rate is equal to or higher than a threshold error rate), for example, the first electronic device 101A may perform beam searching. In this case, the first electronic device 101A may attempt beam searching from a beam adjacent to the mapped beam. For example, if the first electronic device 101A is changed from the unfolded state to the closed state during communication using the beam 2-3, the first electronic device 101A may attempt communication using the beam 4-3 corresponding to the beam 2-3. If beam searching is determined, the first electronic device 101A may perform the beam searching from a beam adjacent to the beam 4-3 of the second beam book. For example, the first electronic device 101A may sequentially perform the beam searching from the beam 4-2 or beam 4-4 of the second beam book. For example, the adjacent beam may be a beam that is physically adjacent to the mapped beam. For another example, the adjacent beam may be a beam having a beam index close to the mapped beam. By performing beam searching using the mapped beam, the first electronic device 101A may reduce a time for beam searching.

Figure 11:
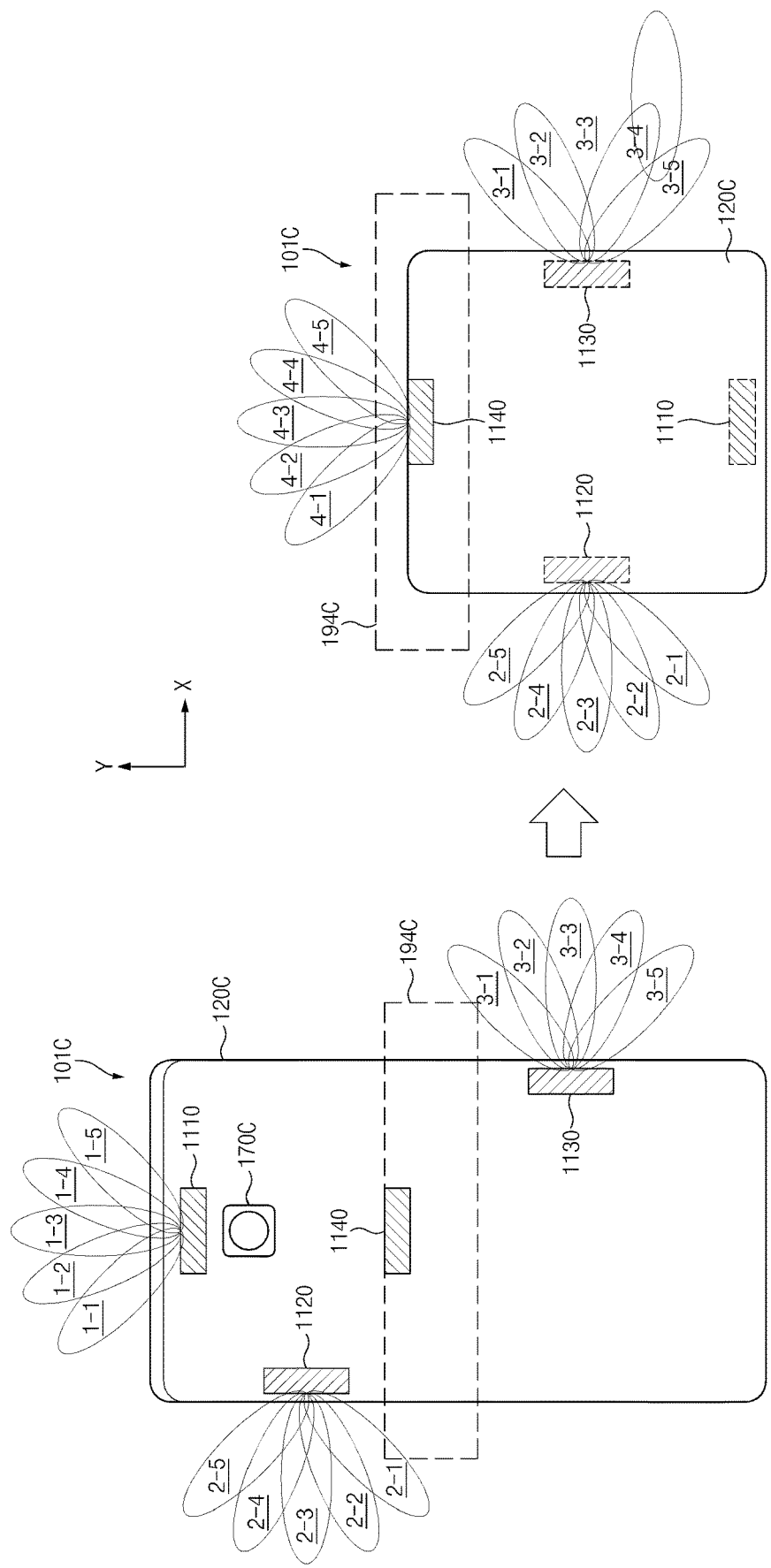
FIG. 11 illustrates beam book operation of an electronic device according to an embodiment.

FIG. 11 illustrates beam book operation of an electronic device according to an example embodiment.

With reference to FIG. 10, the beam book operation methods have been described as including a plurality of communication circuits; however, embodiments of the present disclosure are not limited thereto. For example, the change of the beam book based on the change in the shape described with reference to FIG. 10 may be similarly applied to the electronic device of FIG. 1, the second electronic device 101B of FIG. 7, and the third electronic device 101C. For example, the description with reference to FIG. 10 may be applied to the third electronic device 101C of FIG. 11.

Referring to FIG. 11, according to an example embodiment, in the folded state, the third electronic device 101C may perform communication using the first beam book. For example, the first beam book may include beams associated with antenna modules of a first group (e.g., a first antenna module 1110, a second antenna module 1120, and a third antenna module 1130). In this case, a fourth antenna module 1140 may be turned off. For example, the first beam book includes a beam 1-1, a beam 1-2, a beam 1-3, a beam 1-4, and a beam 1-5, which are associated with the first antenna module 1110, a beam 2-1, a beam 2-2, a beam 2-3, a beam 2-4, and a beam 2-5, which are associated with the second antenna module 1120, and a beam 3-1, a beam 3-2, a beam 3-3, a beam 3-4, and a beam 3-5, which are associated with the third antenna module 1130.

According to an embodiment, in the folded state, the third electronic device 101C may perform communication using the second beam book different from the first beam book. For example, the second beam book may include beams associated with antenna modules of a second group (e.g., the second antenna module 1120, the third antenna module 1130, and a fourth antenna module 1140). In this case, the first antenna module 1110 may be turned off (e.g., disconnected from the communication circuit). For example, the second beam book includes the beam 2-1, the beam 2-2, the beam 2-3, the beam 2-4, and the beam 2-5, which are associated with the second antenna module 1120, the beam 3-1, the beam 3-2, the beam 3-3, the beam 3-4, and the beam 3-5, which are associated with the third antenna module 1130, and a beam 4-1, a beam 4-2, a beam 4-3, a beam 4-4, and a beam 4-5, which are associated with the fourth antenna module 1140.

Referring to FIGS. 11 and 15, for example, the second antenna module 1120 may correspond to the third-first antenna module 1511, and the third antenna module 1130 may correspond to the third-second antenna module 1512. The second antenna module 1120 and the third antenna module 1130 may be connected to an IFIC of the third electronic device 101C (e.g., the fourth RFIC 228 of FIG. 15) regardless of the change in the shape of the third electronic device 101C. For example, the first antenna module 1110 may correspond to the third-third A antenna module 1513A, and the fourth antenna module 1140 may correspond to the third-third B antenna module 1513B. The third electronic device 101C may include a switching circuit corresponding to the first switching circuit 1521 and may enable or activate the first antenna module 1110 or the fourth antenna module 1140 using the switching circuit. In the example of FIG. 11, the second switching circuit 1522, the third-fourth A antenna module 1514A, and the third-fourth B antenna module 1514B of the connecting structure 1501 of FIG. 15 may be omitted.

Referring to FIG. 11, according to an embodiment, the plurality of antenna modules 1110, 1120, 1130, and 1140 may be connected to one communication circuit (e.g., the fourth RFIC 228 of FIG. 2). For example, the communication circuit may be connected to a limited number of antenna modules. For example, the plurality of antenna modules 1110, 1120, 1130, and 1140 may be selectively connected to the communication circuit depending on the state of the third electronic device 101C. For example, in the unfolded state, the first antenna module 1110, the second antenna module 1120, and the third antenna module 1130 may be connected to the communication circuit, and the fourth antenna module 1140 may be disconnected from the communication circuit. For example, the third electronic device 101C may include a switch for selectively connecting at least some of the antenna modules to the communication circuit. For example, the third electronic device 101C may include a switch circuit for selectively connecting the first antenna module 1110 or the fourth antenna module 1140 to the communication circuit. For example, the plurality of antenna modules 1110, 1120, 1130, and 1140 may be selectively enabled depending on the state of the third electronic device 101C.

According to an embodiment, the third electronic device 101C may control the antenna modules 1110, 1120, 1130, and 1140 based on the change in the shape of the electronic device. For example, in the unfolded state, the first antenna module 1110, the second antenna module 1120, and the third antenna module 1130 may be enabled, and the fourth antenna module 1140 may be disabled. For example, in the folded state, the second antenna module 1120, the third antenna module 1130, and the fourth antenna module 1140 may be enabled, and the first antenna module 1110 may be disabled.

According to an embodiment, the memory of the third electronic device 101C may store mapping information between the beams of the first beam book and the beams of the second beam book. For example, the beam 2-5 of the first beam book may be mapped to the beam 2-5 of the second beam book. The fact that third electronic device 101C may perform communication or beam searching using the beam mapped based on the mapping information is as described above with reference to FIG. 10.

The change of the beam book based on the change in the shape described with reference to FIGS. 10 and 11 may be similarly applied to the electronic device 101 of FIG. 1, the second electronic device 101B of FIG. 7, the fourth electronic device 101D, the fifth electronic device 101E, and/or the sixth electronic device 101F of FIG. 8. For example, in the case of the second electronic device 101B, the antenna module may be changed which is configured to radiate to the left or right of the second electronic device 101B depending on the open/closed state of the second electronic device 101B. The communication may be performed using mapping information about the first beam book and the second beam book set depending on the change in the antenna module of the second electronic device 101B and/or a change in the orientation of the antenna module. For another example, in the case of an electronic device of FIG. (e.g., the fourth electronic device 101D, the fifth electronic device 101E, or the sixth electronic device 101F), at least a portion of the antenna module used may be changed with the retraction/extension of the extension part. For example, even if the position of the antenna module is independent of the extension/retraction of the extension part, the available antenna module may be changed as the structure of the electronic device is changed with the extension/retraction of the extension part. For another example, if the position of the antenna module is changed with the extension/retraction of the extension part (e.g., if the antenna module is included in the extension part), the antenna module may be put into a usable state with the change of the position of the antenna module. A beam book to be used may be changed with the change in the available antenna module.

According to various embodiments, an electronic device (e.g., the electronic device 101 of FIG. 1) may include a housing (e.g., the housings 120A, 120B, 120C, 120D, 120E, 121F, and 122F of FIGS. 7 and 8) of which a shape is changeable, a plurality of antenna modules (e.g., the first to fourth antenna modules 910, 920, 930, and 940 or the first to fourth antenna modules 1110, 1120, 1130, and 1140 of FIG. 11) positioned inside the housing, each of the plurality of antenna modules including at least one antenna array, at least one processor (e.g., the second communication processor 214 of FIG. 2) operatively connected to the plurality of antenna modules and configured to perform beamforming using the at least one antenna array, and a memory (e.g., the memory 130 of FIG. 1) connected to the at least one processor comprising processing circuitry. For example, each of the plurality of antenna modules may include at least one antenna array (e.g., the antenna array 430 of FIG. 4). At least one processor may perform beamforming using at least one antenna array. For example, the plurality of antenna modules may include at least one antenna module positioned adjacent to at least one folded portion of the flexible display and/or the housing of the electronic device. The remaining antenna modules except for the at least one antenna module positioned adjacent to the folded portion may be positioned adjacent to a periphery of the housing.

The memory may store one or more instructions that causes the processor comprising processing circuitry of the electronic device to perform operations of the electronic device to be described later with reference to FIGS. 12 to 14.

Figure 12:
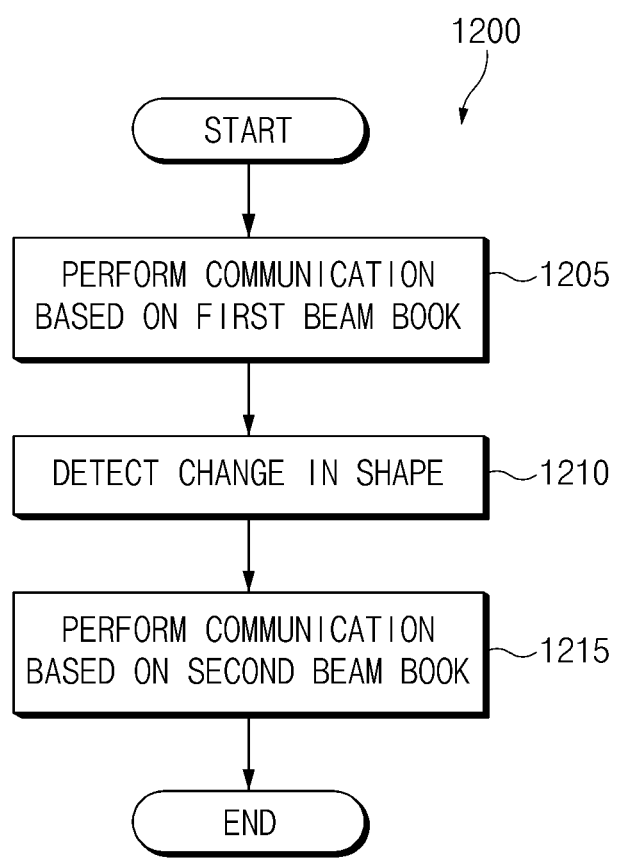
FIG. 12 is a flowchart of a communication method of an electronic device according to an embodiment.

FIG. 12 is a flowchart 1200 of a communication method of an electronic device according to an embodiment.

Referring to FIG. 12, according to an embodiment, in operation 1205, an electronic device (e.g., the electronic device 101 of FIG. 1) may perform communication based on the first beam book. For example, the electronic device may perform communication using one of the beams of the first beam book using an antenna array of at least some of the plurality of antenna modules of the electronic device.

According to an embodiment, in operation 1210, the electronic device may detect a change in the shape of the housing during communication based on the first beam book. For example, the electronic device may further include a flexible display that is viewable through at least a portion of the housing. The electronic device may detect the change in the shape of at least one of the housing or the flexible display (e.g., folded, unfolded, rolled out, rolled in, extended, or retracted). According to an embodiment, the electronic device may detect the change in shape by detecting an acceleration, a magnetic force, and/or a folding angle using a sensor circuit of the electronic device. The electronic device may detect the change in shape by comparing accelerations of regions of the electronic device divided around the folded portion. The electronic device may detect the change in shape by detecting a change in the magnitude of a magnetic force that is changed depending on an open/close state. The electronic device may detect the change in shape using a hinge sensor connected to a hinge structure included in the folded portion of the electronic device. The electronic device may detect the change in shape based on whether the antenna module (comprising at least one antenna) positioned adjacent to the folded portion is shielded. For example, a shielded antenna module (comprising at least one antenna) in an open state may be opened in a closed state. According to an embodiment, the electronic device may detect the change in shape using a sensor for detecting the change in the shape of the housing, which is disposed in the housing. For example, the electronic device may detect the change in shape using a sensor for detecting opening/closing of the housing (e.g., extension/retraction of the extension part).

According to an embodiment, in operation 1215, the electronic device may perform communication based on the second beam book in response to the change in the shape of the housing. For example, the second beam book may include information on beams associated with at least some of the plurality of antenna modules, and may include information on beams different from at least a portion of the first beam book. For example, when the change in shape is detected during communication using the first beam of the first beam book, the electronic device may perform communication based on the second beam of the second beam book mapped to the first beam.

Figure 13:
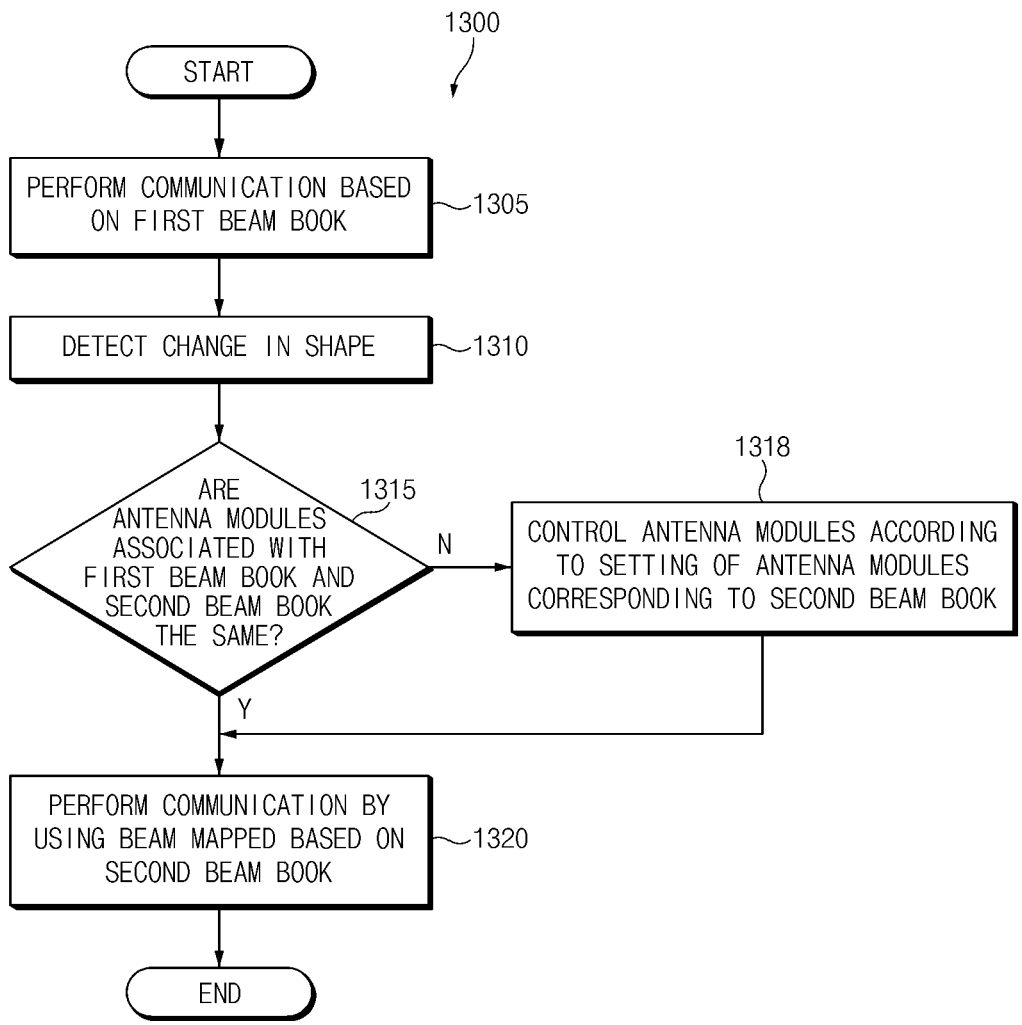
FIG. 13 is a flowchart of a beam book operation method of an electronic device according to an embodiment.

FIG. 13 is a flowchart 1300 of a beam book operation method of an electronic device according to an example embodiment.

According to an embodiment, in operation 1305, an electronic device (e.g., the electronic device 101 of FIG. 1) may perform communication based on the first beam book. For example, the electronic device may perform communication using one (e.g., first beam) of the beams of the first beam book using an antenna array of at least some of the plurality of antenna modules of the electronic device.

According to an embodiment, in operation 1310, the electronic device may detect a change in the shape of the housing during communication based on the first beam book. Description of operation 1310 may be referred to by description of operation 1210 of FIG. 12.

According to an example embodiment, in operation 1315, the electronic device may determine whether antenna modules (comprising antennas) associated with the first beam book and the second beam book are the same. For example, the electronic device may determine that the antenna modules associated with the first beam book and the second beam book are different if at least some of the antenna modules associated with the first beam book and the antenna modules associated with the second beam book are different.

According to an example embodiment, if the antenna modules associated with the first beam book and the second beam book are different (No in 1315), in operation 1318, the electronic device may control the antenna modules according to the setting of antenna modules corresponding to the second beam book. For example, the electronic device may enable the antenna modules associated with the second beam book. For example, the electronic device may enable the antenna modules associated with the second beam book by connecting the antenna modules associated with the second beam book by controlling a switch selectively connecting the IFIC and some of the plurality of antenna modules.

According to an example embodiment, the electronic device may perform operation 1320 if the antenna modules associated with the first beam book and the second beam book are the same (Yes in 1315).

According to an embodiment, in operation 1320, the electronic device may perform communication using the bean mapped based on the second beam book in response to the change in the shape of the housing. Description of operation 1320 may be referred to by description of operation 1205 of FIG. 12.

Figure 14:
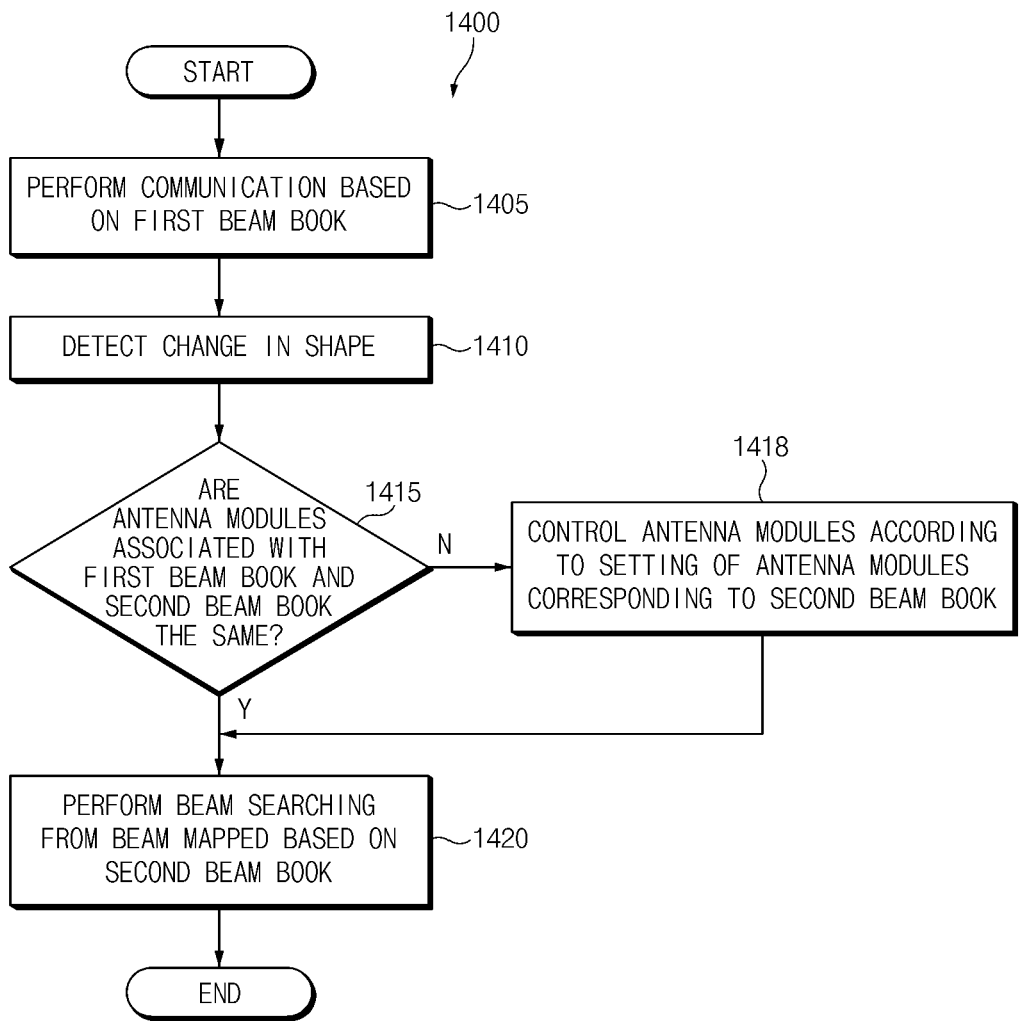
FIG. 14 is a flowchart of a beam searching method according to an embodiment.

FIG. 14 is a flowchart 1400 of a beam searching method according to an example embodiment.

According to an embodiment, in operation 1405, an electronic device (e.g., the electronic device 101 of FIG. 1) may perform communication based on the first beam book. For example, the electronic device may perform communication using one (e.g., first beam) of the beams of the first beam book using an antenna array of at least some of the plurality of antenna modules of the electronic device.

According to an embodiment, in operation 1410, the electronic device may detect a change in the shape of the housing during communication based on the first beam book. Description of operation 1410 may be referred to by description of operation 1210 of FIG. 12.

According to an embodiment, in operation 1415, the electronic device may determine whether antenna modules associated with the first beam book and the second beam book are the same. Description of operation 1415 may be referred to by description of operation 1315 of FIG. 13.

According to an embodiment, if the antenna modules associated with the first beam book and the second beam book are different (No in 1415), in operation 1418, the electronic device may control the antenna modules according to the setting of antenna modules corresponding to the second beam book. Description of operation 1418 may be referred to by description of operation 1318 of FIG. 13.

According to an embodiment, the electronic device may perform operation 1420 if the antenna modules associated with the first beam book and the second beam book are the same (Yes in 1415).

According to an embodiment, in operation 1420, the electronic device may perform beam searching from the beam mapped based on the second beam book in response to the change in the shape of the housing. For example, the electronic device may perform beam searching using beams sequentially adjacent to the second beam of the second beam book mapped to the first beam of the first beam book. For example, the electronic device may perform beam searching when the communication quality using the second beam is less than or equal to a threshold value. For another example, the electronic device may perform beam searching when the change in shape is detected regardless of the communication quality.

According to various example embodiments, an electronic device (e.g., the electronic device 101 of FIG. 1) may include a housing (e.g., the housings 120A, 120B, 120C, 120D, 120E, 121F, and 122F of FIGS. 7 and 8) of which a shape is changeable, a plurality of antenna modules (e.g., the first to fourth antenna modules 910, 920, 930, and 940 or the first to fourth antenna modules 1110, 1120, 1130, and 1140 of FIG. 11) positioned inside the housing, each of the plurality of antenna modules including at least one antenna array, at least one processor (e.g., the second communication processor 214 of FIG. 2) operatively connected to the plurality of antenna modules and configured to perform beamforming using the at least one antenna array, and a memory (e.g., the memory 130 of FIG. 1) connected to the at least one processor. For example, each of the plurality of antenna modules may include at least one antenna array (e.g., the antenna array 430 of FIG. 4). At least one processor may perform beamforming using at least one antenna array.

According to an embodiment, the memory may store instructions that, when executed, cause the at least one processor to perform communication based on a first beam book including information on beams associated with at least some of the plurality of antenna modules, using the plurality of antenna modules, detect a change in the shape of the housing during communication based on the first beam book, and perform communication based on a second beam book including information on beams associated with at least some of the plurality of antenna modules and including information on beams different from the at least a portion of the first beam book, in response to the change in the shape.

According to an embodiment, when executed, the one or more instructions may cause the at least one processor to perform communication based on a first beam of the first beam book, using the plurality of antenna modules, detect the change in the shape of the housing during communication using the first beam book, and perform communication based on a second beam of the second beam book mapped to the first beam, in response to the change in the shape.

According to an embodiment, when executed, the one or more instructions may cause the at least one processor to perform beam searching from a beam adjacent to the second beam.

According to an embodiment, when executed, the one or more instructions may cause the at least one processor to perform the beam searching if a communication quality of the communication based on the second beam is lower than or equal to a threshold value.

For example, at least some of antenna modules associated with the first beam book and antenna modules associated with the second beam book may be different.

According to an embodiment, when executed, the one or more instructions may cause the at least one processor to enable the antenna modules associated with the second beam book among the plurality of antenna modules, in response to the change in the shape.

According to an embodiment, the at least one processor may be selectively connected to some of the plurality of antenna modules through an intermediate frequency integrated circuit and a switch (e.g., the first switching circuit 1521 and/or the second switching circuit 1522 of FIG. 15). When executed, the one or more instructions may cause the at least one processor to control the switch in response to the change in the shape to connect the antenna modules associated with the second beam book among the plurality of antenna modules to the intermediate frequency integrated circuit.

According to an embodiment, the electronic device may further include a flexible display that is viewable through at least a portion of the housing. When executed, the one or more instructions may cause the at least one processor to detect a change in a shape of at least one of the housing or the flexible display. The change in the shape may include folding or unfolding.

According to an embodiment, when executed, the one or more instructions may cause the at least one processor to detect the change in the shape by detecting at least one of an acceleration, a magnetic force, or a folding angle using the sensor circuit.

According to an embodiment, the plurality of antenna modules may include at least one antenna module positioned adjacent to at least one folded portion of the flexible display and the housing, and the rest of the plurality of antenna modules except for the at least one antenna module may be positioned adjacent to a periphery of the housing.

According to various embodiments, a communication method of an electronic device including a housing of which a shape is changeable may include performing communication based on a first beam book including information on beams associated with at least some of the plurality of antenna modules, using a plurality of antenna modules positioned in the housing, detecting a change in the shape of the housing during communication based on the first beam book, and performing communication based on a second beam book including information on beams associated with at least some of the plurality of antenna modules and including information on beams different from the at least a portion of the first beam book, in response to the change in the shape.

According to an embodiment, the performing of the communication based on the first beam book may include performing communication based on a first beam of the first beam book. The performing of the communication based on the second beam book may include performing communication based on a second beam of the second beam book mapped to the first beam in response to the change in the shape.

According to an embodiment, the method may further include performing beam searching from a beam adjacent to the second beam.

According to an embodiment, the performing of the beam searching may include performing the beam searching if a communication quality of communication based on the second beam is lower than or equal to a threshold value.

According to an embodiment, at least some of antenna modules associated with the first beam book and antenna modules associated with the second beam book may be different.

According to an embodiment, the method may include enabling the antenna modules associated with the second beam book among the plurality of antenna modules, in response to the change in the shape. For example, the enabling of the antenna modules associated with the second beam book may include selectively connecting antenna modules associated with the second beam book among the plurality of antenna modules to an intermediate frequency integrated circuit of the electronic device, in response to the change in the shape.

According to an embodiment, the detecting of the change in the shape may include detecting a change in at least one shape of the housing and a flexible display that is viewable through at least a portion of the housing. For example, the change in the shape may include folding or unfolding.

According to an embodiment, the detecting of the change in at least one shape of the housing and the flexible display that is viewable through at least the portion of the housing may include detecting the change in the shape by detecting at least one of an acceleration, a magnetic force, or a folding angle of the electronic device.

According to an embodiment, the plurality of antenna modules may include at least one antenna module positioned adjacent to at least one folded portion of the flexible display and the housing, and the rest of the plurality of antenna modules except for the at least one antenna module may be positioned adjacent to a periphery of the housing.

What is claimed is:

1. An electronic device comprising:
   a housing with a changeable form;
   a plurality of antenna modules positioned inside the housing, each of the plurality of antenna modules including at least one antenna array;
   a memory; and
   at least one processor operatively connected to the plurality of antenna modules and the memory and configured to perform beamforming using the at least one antenna array,
   wherein the at least one processor is further configured to:
   perform communication based at least on a first beam of a first beam book including information on beams associated with at least some of the plurality of antenna modules, using the plurality of antenna modules;
   detect a change in a form of the housing during communication based at least on the first beam of the first beam book;
   perform communication based at least on a second beam of a second beam book including information on beams associated with at least some of the plurality of antenna modules and including information on beams different from at least a portion of the first beam book, in response to at least the change in the form; and
   perform beam searching from a beam adjacent to the second beam, wherein the second beam of the second beam book is mapped to the first beam of the first beam book.

2. The electronic device of claim 1, further comprising a sensor circuit, and wherein the at least one processor is further configured to detect the change in the form by detecting at least one of an acceleration, a magnetic force, or a folding angle using the sensor circuit.

3. The electronic device of claim 1, wherein the plurality of antenna modules include at least one antenna module positioned adjacent to at least one folded portion of the housing, and
   the rest of the plurality of antenna modules except for the at least one antenna module is positioned adjacent to a periphery of the housing.

4. The electronic device of claim 1, wherein the at least one processor is further configured to perform the beam searching if a communication quality of the communication based on the second beam is lower than or equal to a threshold value.

5. The electronic device of claim 1, wherein at least some of antenna modules associated with the first beam book and antenna modules associated with the second beam book are different.

6. The electronic device of claim 5, wherein the at least one processor is further configured to enable the antenna modules associated with the second beam book among the plurality of antenna modules, in response to at least the change in the form.

7. The electronic device of claim 6, wherein the at least one processor is selectively connected to some of the plurality of antenna modules through an intermediate frequency integrated circuit and a switch, and
   the at least one processor is further configured to control the switch in response to the change in the form to connect the antenna modules associated with the second beam book among the plurality of antenna modules to the intermediate frequency integrated circuit.

8. An electronic device comprising:
   a housing;
   a flexible display that is viewable through at least a portion of the housing;

a plurality of antenna modules positioned inside the housing, each of the plurality of antenna modules including at least one antenna array;

a memory; and at least one processor operatively connected to the plurality of antenna modules and the memory and configured to perform beamforming using the at least one antenna array, wherein the at least one processor is further configured to:

perform communication based at least on a first beam of a first beam book including information on beams associated with at least some of the plurality of antenna modules, using the plurality of antenna modules;

detect a change in a form of the flexible display during communication based at least on the first beam of the first beam book, wherein the change in the form includes folding or unfolding;

perform communication based at least on a second beam of a second beam book including information on beams associated with at least some of the plurality of antenna modules and including information on beams different from at least a portion of the first beam book, in response to at least the change in the form; and perform beam searching from a beam adjacent to the second beam.

9. The electronic device of claim 8, further comprising a sensor circuit, and wherein the at least one processor is further configured to detect the change in the form by detecting at least one of an acceleration, a magnetic force, or a folding angle using the sensor circuit.

10. The electronic device of claim 9, wherein the plurality of antenna modules include at least one antenna module positioned adjacent to at least one folded portion of the flexible display and the housing, and the rest of the plurality of antenna modules except for the at least one antenna module is positioned adjacent to a periphery of the housing.

11. A communication method of an electronic device including a housing of which a form is changeable, the communication method comprising:

performing communication based on a first beam of a first beam book including information on beams associated with at least some of a plurality of antenna modules of the electronic device, using a plurality of antenna modules positioned in the housing;

detecting a change in a form of the housing during communication based on the first beam of the first beam book;

performing communication based on a second beam of a second beam book including information on beams associated with at least some of the plurality of antenna modules and including information on beams different from at least a portion of the first beam book, in response to the change in the form; and performing beam searching from a beam adjacent to the second beam, wherein the second beam of the second beam book is mapped to the first beam of the first beam book.

12. The communication method of claim 11, further comprising detecting the change in the form by detecting at least one of an acceleration, a magnetic force, or a folding angle using a sensor circuit.

13. The communication method of claim 11, wherein the performing of the beam searching includes performing the beam searching if a communication quality of communication based on the second beam is lower than or equal to a threshold value.

14. The communication method of claim 11, wherein at least some of antenna modules associated with the first beam book and antenna modules associated with the second beam book are different.

* * * * *